(12) United States Patent
Hildreth

(10) Patent No.: US 10,269,133 B2
(45) Date of Patent: Apr. 23, 2019

(54) CAPTURING IMAGES OF A GAME BY AN UNMANNED AUTONOMOUS VEHICLE

(71) Applicant: QUALCOMM Incorporated, San Diego, CA (US)

(72) Inventor: Evan Hildreth, Maple (CA)

(73) Assignee: QUALCOMM Incorporated, San Diego, CA (US)

(*) Notice: Subject to any disclaimer, the term of this patent is extended or adjusted under 35 U.S.C. 154(b) by 111 days.

(21) Appl. No.: 15/397,286

(22) Filed: Jan. 3, 2017

(65) Prior Publication Data

US 2018/0189971 A1 Jul. 5, 2018

(51) Int. Cl.

| | |
|---|---|
| G06K 9/00 | (2006.01) |
| G06T 7/13 | (2017.01) |
| G06T 7/70 | (2017.01) |
| H04N 21/44 | (2011.01) |
| H04N 21/45 | (2011.01) |
| H04N 5/232 | (2006.01) |
| H04N 21/422 | (2011.01) |
| H04N 21/478 | (2011.01) |
| H04N 21/4223 | (2011.01) |
| G05D 1/00 | (2006.01) |

(Continued)

(52) U.S. Cl.
CPC ............ *G06T 7/70* (2017.01); *A63B 24/0021* (2013.01); *A63B 43/004* (2013.01); *A63H 27/12* (2013.01); *A63H 33/18* (2013.01); *G05D 1/0094* (2013.01); *G06K 9/0063* (2013.01); *G06K 9/00671* (2013.01); *G06T 7/13* (2017.01); *H04N 5/232* (2013.01); *H04N 21/422* (2013.01); *H04N 21/4223* (2013.01); *H04N 21/44008* (2013.01); *H04N 21/4524* (2013.01); *H04N 21/4781* (2013.01); *G06T 2207/10032* (2013.01); *G06T 2207/30224* (2013.01); *G06T 2207/30228* (2013.01); *G06T 2207/30244* (2013.01)

(58) Field of Classification Search
None
See application file for complete search history.

(56) References Cited

U.S. PATENT DOCUMENTS 9,769,387 B1 * 9/2017 Beard ................ H04N 5/23296
2007/0279494 A1 12/2007 Aman et al.
(Continued)

FOREIGN PATENT DOCUMENTS

| WO | 2015179797 A1 | 11/2015 |
|---|---|---|
| WO | 2016032968 A1 | 3/2016 |
| WO | 2016161426 A1 | 10/2016 |

OTHER PUBLICATIONS

International Search Report and Written Opinion—PCT/US2017/057992—ISA/EPO—Mar. 2, 2018.

*Primary Examiner* — Matthew C Bella
*Assistant Examiner* — Jose Torres
(74) *Attorney, Agent, or Firm* — The Marbury Law Group, PLLC

(57) ABSTRACT

Embodiments include devices and methods for capturing images of a game by an unmanned autonomous vehicle (UAV). A processor of the UAV may determine game play rules of the game. The processor may determine a location of the game object. The processor may calculate a position from which to capture an image of the game based on the determined game play rules and the location of the game object. The processor may capture an image of the game from the calculated position.

28 Claims, 19 Drawing Sheets

(51) Int. Cl.
  *A63B 24/00*    (2006.01)
  *A63B 43/00*    (2006.01)
  *A63H 27/00*    (2006.01)
  *A63H 33/18*    (2006.01)

(56) References Cited

U.S. PATENT DOCUMENTS

| | | |
|---|---|---|
| 2010/0026809 A1* | 2/2010 | Curry .................... H04N 5/222 |
| | | 348/157 |
| 2015/0350606 A1 | 12/2015 | Khanfor |
| 2015/0350614 A1 | 12/2015 | Meier et al. |
| 2016/0055883 A1 | 2/2016 | Soll et al. |
| 2016/0101358 A1 | 4/2016 | Ibrahim et al. |
| 2016/0121204 A1 | 5/2016 | Shen et al. |
| 2016/0243441 A1* | 8/2016 | Garbowski ........... A63F 13/358 |
| 2016/0250535 A1* | 9/2016 | Yatsko .................. A63H 27/12 |
| | | 273/317.1 |
| 2017/0164015 A1* | 6/2017 | Abramov ............. H04N 21/234 |
| 2017/0213089 A1* | 7/2017 | Chen .................. G06K 9/00771 |
| 2018/0137363 A1* | 5/2018 | Campagnoli ...... G06K 9/00724 |
| 2018/0139152 A1* | 5/2018 | Shaw ................. H04L 49/1584 |

* cited by examiner

CAPTURING IMAGES OF A GAME BY AN UNMANNED AUTONOMOUS VEHICLE

BACKGROUND

Unmanned autonomous vehicles (UAVs) are being developed for a wide range of applications. UAVs are typically equipped with one or more sensors, such as cameras capable of capturing an image, a sequence of images, or video.

Certain UAVs, such as UAVs capable of flight, are increasingly used for photography and video capture. For example, UAVs may provide a "follow me" tracking or "selfie" features in which the UAV follows a single person, such as a mountain biker or snowboarder, while recording video. This capability is typically limited to following a single person, and such UAVs are not capable of intelligently following participants in team sports, children's play, or other activities involving multiple people. Further, current UAVs are unable to consider the context of the sport or event that the UAV is recording.

SUMMARY

Various embodiments include methods of capturing images of a game by an unmanned autonomous vehicle (UAV) that may be performed by a processor of the UAV. Various embodiments may include determining game play rules of the game, determining a location of a game object, calculating a position from which to capture images of the game based on the determined game play rules and the location of the game object, and capturing an image of the game from the calculated position.

In some embodiments, determining the game play rules may include obtaining the game play rules from a memory coupled to the processor of the UAV. In some embodiments, determining the game play rules may include surveying a playing area of the game, identifying a landmark of the playing area, and determining the game play rules based on the identified landmark of the playing area.

In some embodiments, determining the location of the game object may include receiving telemetry from the game object, and determining the location of the game object based on the received telemetry. In some embodiments, calculating the position from which to capture the image of the game based on the determined game play rules and the location of the game object may include predicting a game action based on the game play rules and the determined location of the game object, and calculating the position based on the predicted game action. In some embodiments, calculating the position from which to capture the image of the game based on the determined game play rules and the location of the game object may include characterizing a game context based on the determined game play rules and the location of the game object, and calculating the position based on the characterized game context.

Some embodiments may further include determining whether the game context has changed, and calculating another position from which to capture a second image of the game based on the determined game play rules and the changed game context. In some embodiments, capturing the image of the game from the calculated position may include moving the UAV to the calculated position. In some embodiments, capturing the image of the game from the calculated position may include selecting a second UAV proximate to the calculated position, and capturing the image of the game from the calculated position by the second UAV.

Further embodiments may include a UAV having an image sensor and a processor coupled to the image sensor and configured with processor-executable instructions to perform operations of the methods summarized above. Further embodiments may include a UAV that includes means for performing functions of the methods summarized above. Further embodiments may include a non-transitory processor-readable medium having stored thereon processor-executable instructions configured to cause a processor of a UAV to perform operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
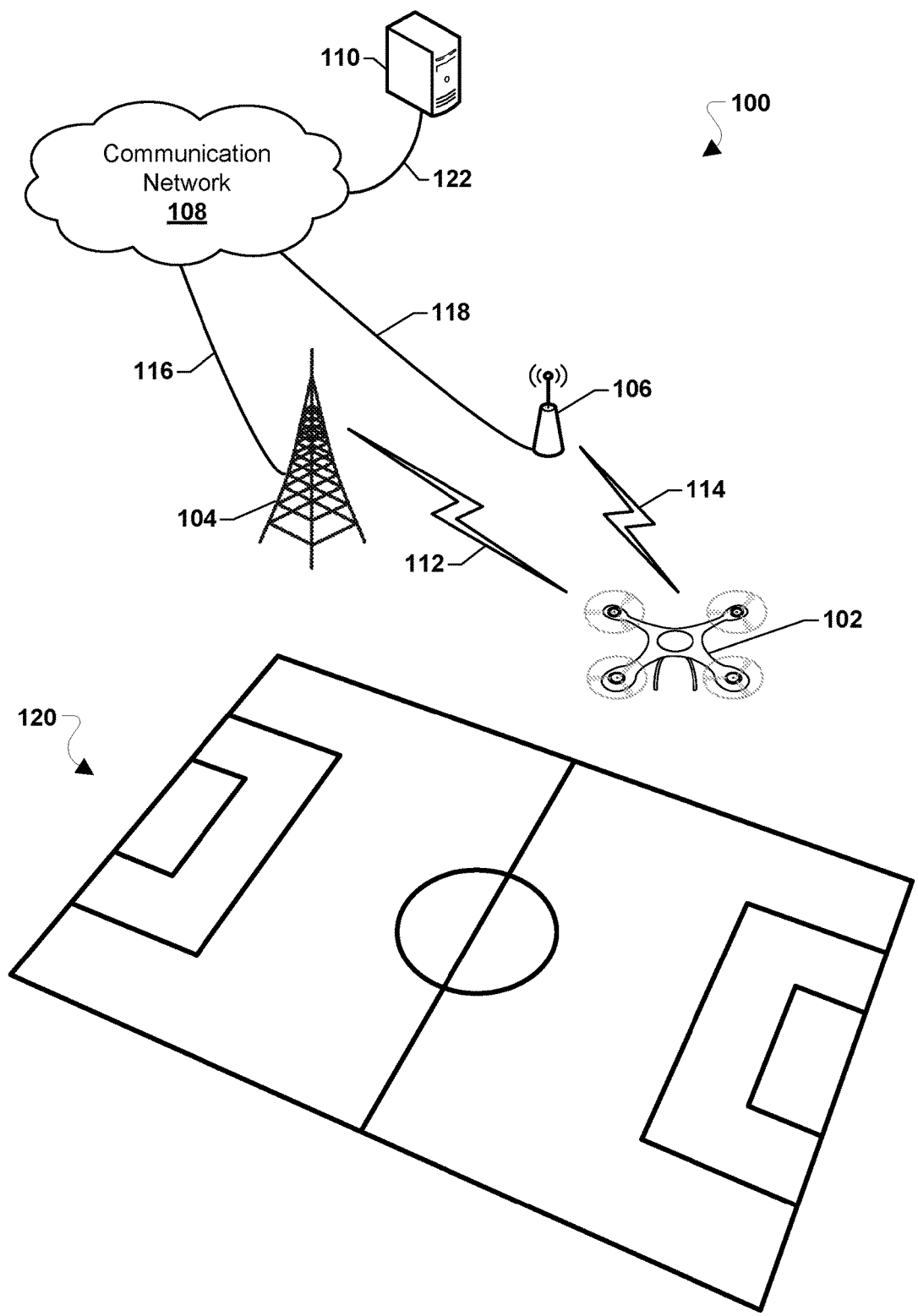
FIG. 1 is a system block diagram of a UAV operating within a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a UAV for capturing images of a game or other event using a camera of the UAV based upon rules of the game, which may be stored in memory and/or learned by the UAV processor by analyzing images of the playing field, actions of players, and/or inputs from wirelessly-enable sports equipment.

As used herein, the term "UAV" refers to one of various types of unmanned autonomous vehicles. A UAV may include an onboard computing device configured to maneuver and/or navigate the UAV without remote operating instructions (i.e., autonomously), such as from a human operator or remote computing device. Alternatively, the onboard computing device may be configured to maneuver and/or navigate the UAV with some remote operating instruction or updates to instructions stored in a memory of the onboard computing device. In some implementations, a UAV may be an aerial vehicle (often referred to as a "drone") propelled for flight using a plurality of propulsion units, each including one or more rotors, that provide propulsion and/or lifting forces for the UAV. UAV propulsion units may be powered by one or more types of electric power sources, such as batteries, fuel cells, motor-generators, solar cells, or other sources of electric power, which may also power the onboard computing device, navigation components, and/or other onboard components.

The term "camera" refers to any of a variety of image sensors that may be mounted on a UAV, and which may use, for example, one or more image capture technologies, such as charge coupled device (CCD) and complementary metal oxide semiconductor (CMOS).

The term "game" refers to a contest or competition between two or more players that is conducted according to rules ("game play rules"). A game is typically played in a "playing area," such as a field or a court, which may include landmarks such as boundaries, and may include a goal or goal area.

The term "game object" refers to an object that is typically moved or controlled during the game around the playing area and/or among players. Examples of the game object include (but are not limited to) a ball, a puck, a Frisbee, a shuttlecock, a flag, and the like. In some embodiments, the game object may include a device configured to determine information about the location and/or motion of the game object and to transmit such information as telemetry.

The term "image" refers to one or more images, and may include a still image and a video recording. "Capturing an image" refers to capturing (recording) one or more still images and/or a video recording.

UAVs are increasingly equipped with image sensor devices for capturing images and video. Certain UAVs may include a "follow me" tracking or "selfie" features in which the UAV follows a solo athlete, such as a mountain biker or snowboarder, while recording video. However, this capability is typically limited to following a single person, and UAVs are not capable of intelligently following participants in team sports, children's play, or other activities involving multiple people. Further, such UAVs are unable to consider the context of the sport or event that the UAV is recording.

Various embodiments overcome limitations of conventional UAVs by providing methods implemented by a processor of a UAV for capturing images of a game using a camera of the UAV.

In various embodiments, the processor of the UAV may determine game play rules. For example, the processor may perform a survey of a playing area using the camera, may identify one or more landmarks of the playing area, and may determine the game play rules based on the identified landmarks of the playing area. As another example, the processor may receive a user selection of a game (for example, soccer, baseball, football, etc.), and the processor may determine the game play rules of the selected game. As another example, the processor may recognize a game from the shape and dimensions of a playing field (for example, soccer pitch, baseball diamond, football field, etc.), and the processor may determine the game play rules of the recognized game. In some embodiments, the processor may retrieve the game play rules from a memory of the UAV and/or download the rules from a remote location, such as a remote server, a remote storage device, a controller, or the like.

The processor may determine a location of a game object (e.g., a ball), for example by recognizing the game object in an image and/or receiving coordinates of the object via a wireless communication link with a wireless-enabled game object. In some embodiments, the processor may determine motions of the game object, such as a motion vector. In some embodiments, the processor may receive telemetry from the game object, which may include information about the location, motion, and/or accelerations of the game object. For example, the game object may be a "smart ball" or similar game object configured with electronics to determine information about the game object location, motion and/or accelerations. Such electronics may include a processor, a global positioning system (GPS) receiver, and accelerometer, a gravimeter, an inertial motion detector, or sensors. Such electronics may also include a radio frequency (RF) transceiver or transmitter to transmit the information, for example, as telemetry for reception by the UAV.

Based on the determined game play rules and the location of the game object, the processor may calculate a position from which to capture an image of the game. In some embodiments, the processor may predict the game action based on the game play rules and the determined location of the game object. In some embodiments, the processor may predict the game action based on a previous game action. In some embodiments, the processor may predict game action based on a motion of the game object relative to a landmark of the playing area.

The processor may capture an image of the game from the calculated position. In some embodiments, the processor may move the UAV in the direction of or to the calculated position in order to capture the image of the game. In some embodiments, the processor may select a second UAV that is proximate to the calculated position, and the second UAV may capture the image of the game. In some embodiments, the UAV (and/or the second UAV) may capture audio and video, or audio only.

Various embodiments may be implemented within a UAV operating within a variety of communication systems 100, an example of which is illustrated in FIG. 1. With reference to FIG. 1, the communication system 100 may include a UAV 102, a base station 104, an access point 106, a communication network 108, and a network element 110.

The base station 104 and the access point 106 may provide wireless communications to access the communication network 108 over a wired and/or wireless communications backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The UAV 102 may communicate with the base station 104 over a wireless communication link 112 and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

The network element 110 may include a network server or another similar network element. The network element 110 may communicate with the communication network 108 over a communication link 122. The UAV 102 and the network element 110 may communicate via the communication network 108. The network element 110 may provide the UAV 102 with a variety of information, such as navigation information, weather information, access to a database of game rules, movement control instructions, and other information, instructions, or commands relevant to operations of the UAV 102.

In various embodiments, the UAV 102 may move around a playing area 120. As the UAV 102 moves around the playing area 120, the processor of the UAV 102 may capture images or video of a game played therein.

Figure 2:
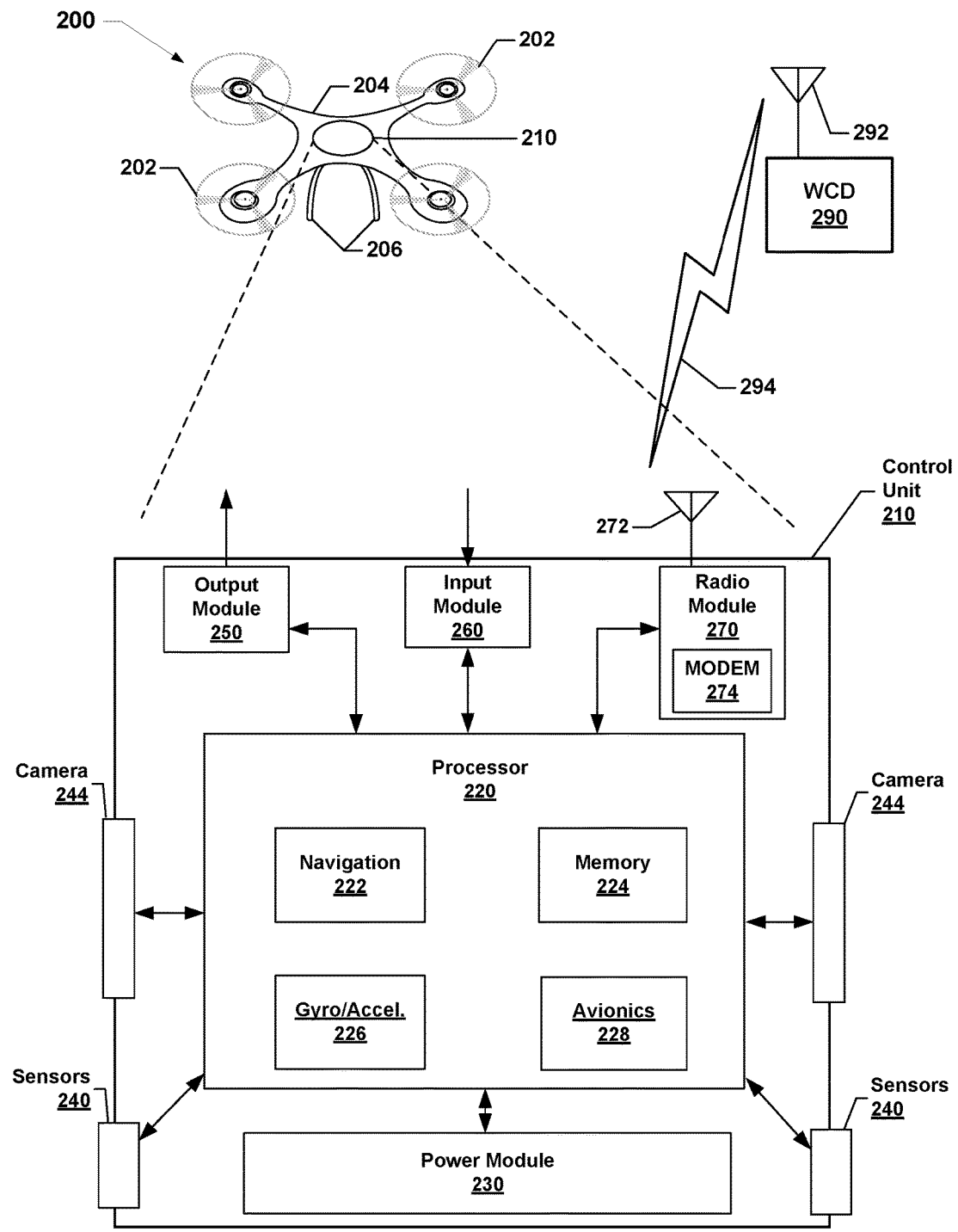
FIG. 2 is a component block diagram illustrating components of a UAV according to various embodiments.

UAVs may include winged or rotorcraft varieties. FIG. 2 illustrates an example UAV 200 of a rotary propulsion design that utilizes one or more rotors 202 driven by corresponding motors to provide lift-off (or take-off) as well as other aerial movements (e.g., forward progression, ascension, descending, lateral movements, tilting, rotating, etc.). The UAV 200 is illustrated as an example of a UAV that may utilize various embodiments, but is not intended to imply or require that various embodiments are limited to rotorcraft UAVs. Various embodiments may be used with winged UAVs as well. Further, various embodiments may equally be used with land-based autonomous vehicles, water-borne autonomous vehicles, and space-based autonomous vehicles.

With reference to FIGS. 1 and 2, the UAV 200 may be similar to the UAV 102. The UAV 200 may include a number of rotors 202, a frame 204, and landing columns 206 or skids. The frame 204 may provide structural support for the motors associated with the rotors 202. The landing columns 206 may support the maximum load weight for the combination of the components of the UAV 200 and, in some cases, a payload. For ease of description and illustration, some detailed aspects of the UAV 200 are omitted such as wiring, frame structure interconnects, or other features that would be known to one of skill in the art. For example, while the UAV 200 is shown and described as having a frame 204 having a number of support members or frame structures, the UAV 200 may be constructed using a molded frame in which support is obtained through the molded structure. While the illustrated UAV 200 has four rotors 202, this is merely exemplary and various embodiments may include more or fewer than four rotors 202.

The UAV 200 may further include a control unit 210 that may house various circuits and devices used to power and control the operation of the UAV 200. The control unit 210 may include a processor 220, a power module 230, sensors 240, one or more cameras 244, an output module 250, an input module 260, and a radio module 270.

The processor 220 may be configured with processor-executable instructions to control travel and other operations of the UAV 200, including operations of various embodiments. The processor 220 may include or be coupled to a navigation unit 222, a memory 224, a gyro/accelerometer unit 226, and an avionics module 228. The processor 220 and/or the navigation unit 222 may be configured to communicate with a server through a wireless connection (e.g., a cellular data network) to receive data useful in navigation, provide real-time position reports, and assess data.

The avionics module 228 may be coupled to the processor 220 and/or the navigation unit 222, and may be configured to provide travel control-related information such as altitude, attitude, airspeed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, or other similar sensors. The avionics module 228 may include or receive data from the gyro/accelerometer unit 226 that provides data regarding the orientation and accelerations of the UAV 200 that may be used in navigation and positioning calculations, as well as providing data used in various embodiments for processing images.

The processor 220 may further receive additional information from the sensors 240, such as an image sensor or optical sensor (e.g., capable of sensing visible light, infrared, ultraviolet, and/or other wavelengths of light). The sensors 240 may also include a radio frequency (RF) sensor, a barometer, a sonar emitter/detector, a radar emitter/detector, a microphone or another acoustic sensor, a lidar sensor, a time-of-flight (TOF) 3-D camera, or another sensor that may provide information usable by the processor 220 for movement operations as well as navigation and positioning calculations. The sensors 240 may include one or more cameras 240 for capturing images of a game.

The power module 230 may include one or more batteries that may provide power to various components, including the processor 220, the sensors 240, the one or more cameras 244, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the rotors 202 and other components.

The UAV 200 may be controlled through control of the individual motors of the rotors 202 as the UAV 200 progresses toward a destination. The processor 220 may receive data from the navigation unit 222 and use such data in order to determine the present position and orientation of the UAV 200, as well as the appropriate course towards the destination or intermediate sites. In various embodiments, the navigation unit 222 may include a GNSS receiver system (e.g., one or more global positioning system (GPS) receivers) enabling the UAV 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other UAVs, etc.

The radio module 270 may be configured to receive navigation signals, such as signals from aviation navigation facilities, etc., and provide such signals to the processor 220 and/or the navigation unit 222 to assist in UAV navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. The radio module 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device with which the UAV 200 may communicate (such as the network element 110). The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server through intermediate access points. In an example, the wireless communication device 290 may be a server of a UAV operator, a third party service (e.g., package delivery, billing, etc.), or a site communication access point. The UAV 200 may communicate with a server through one or more intermediate communication links, such as a wireless telephony network that is coupled to a wide area network (e.g., the Internet) or other communication devices. In some embodiments, the UAV 200 may include and employ other forms of radio communication, such as mesh connections with other UAVs or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera 244 or sensor, or may receive electronic signals from other components (e.g., a payload).

While various components of the control unit 210 are illustrated as separate components, some or all of the components (e.g., the processor 220, the output module 250, the radio module 270, and other units) may be integrated together in a single device or module, such as a system-on-chip module.

Figure 3:
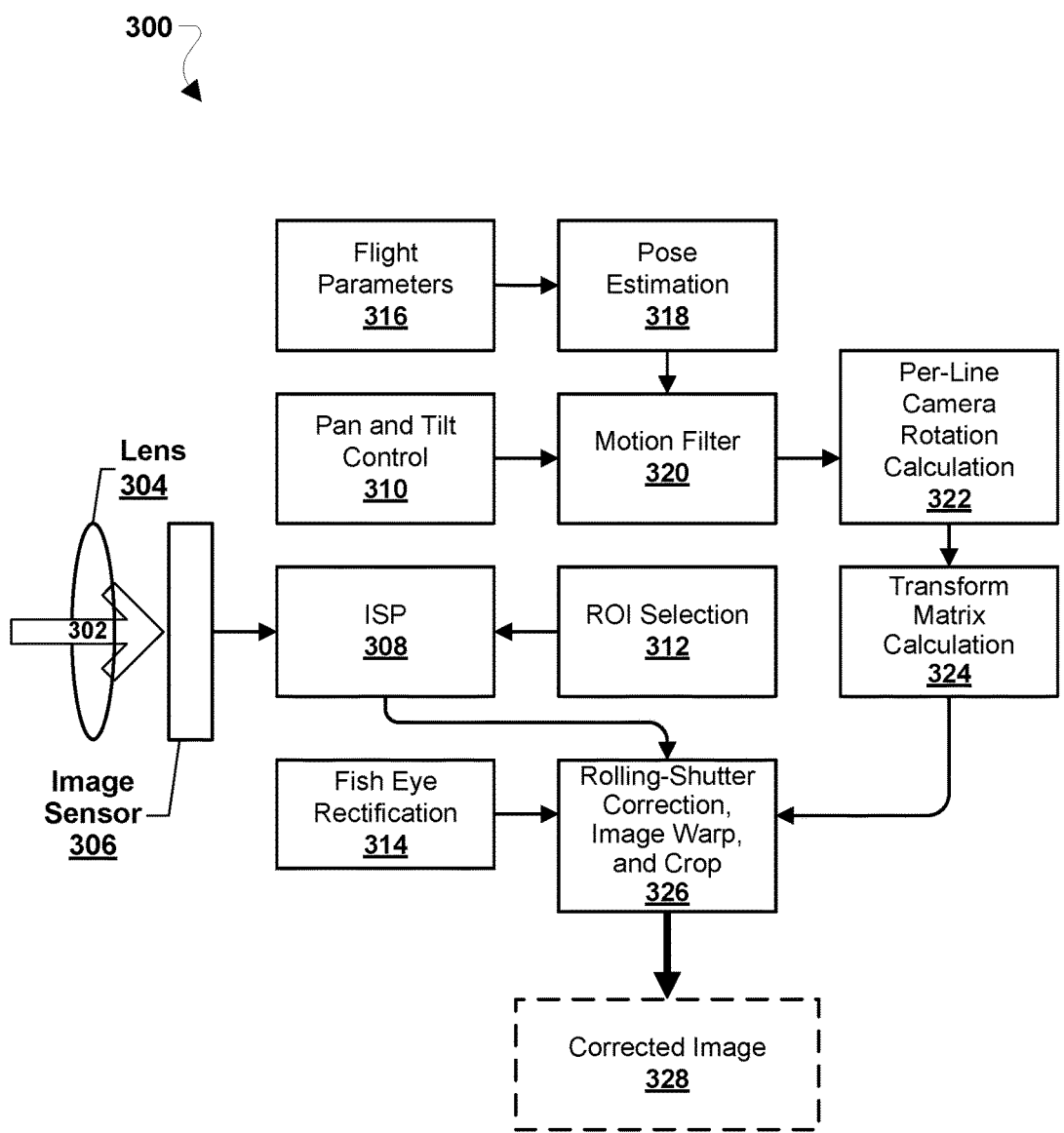
FIG. 3 is a component block diagram illustrating components of an image capture and processing system of a UAV according to various embodiments.

FIG. 3 illustrates an image capture and processing system 300 of a UAV (e.g., 102, 200 in FIGS. 1 and 2) according to various embodiments. With reference to FIGS. 1-3, the image capture and processing system 300 may be implemented in hardware components and/or software components of the UAV, the operation of which may be controlled by one or more processors (e.g., the processor 220 and/or the like) of the UAV.

An image sensor 306 may capture light of an image 302 that enters through a lens 304. The lens 304 may include a fish eye lens or another similar lens that may be configured to provide a wide image capture angle. The image sensor 306 may provide image data to an image signal processing (ISP) unit 308. A region of interest (ROI) selection unit 312 may provide data to the ISP 308 data for the selection of a region of interest within the image data.

The ISP 308 may provide image information and ROI selection information to a rolling-shutter correction, image warp, and crop unit 326. A fish eye rectification unit 314 may provide information and/or processing functions to the rolling-shutter correction, image warp, and crop unit 326.

A flight parameters unit 316 may determine inertial measurement data and UAV position and orientation data. For example, the flight parameters unit 316 may obtain or receive the inertial measurement data and UAV position and orientation data from one or more sensors of the UAV (e.g., the sensors 240). The flight parameters unit 316 may provide the inertial measurement data and UAV position and orientation data to a pose estimation unit 318. ("Pose" is a portmanteau of "position" and "orientation.")

The pose estimation unit 318 may determine a position and orientation of the UAV based on the inertial measure data and the position and orientation data. In some embodiments, the pose estimation unit 318 may determine the position and orientation (e.g., pitch, roll, and yaw) of the UAV based on a coordinate system of the UAV (e.g., north east down (NED) or north west up (NWU)). The pose estimate unit 318 may provide the determined position and orientation of the UAV to a motion filter unit 320. Additionally, a pan and tilt control unit 310 may provide data about the pan and/or tilt of the image sensor to the motion filter unit 320.

The motion filter unit 320 may determine physical and/or virtual pose changes of an image sensor of the UAV (e.g., a sensor 240, camera 244, etc.) based on the position and orientation information from the pose estimation unit 318 and the pan and/or tilt information from the pan and tilt control unit 310. In some embodiments, the motion filter unit 320 may determine the physical or virtual pose changes of the image sensor over time. In some embodiments, the motion filter unit 320 may determine the physical or virtual pose changes based on one or more changes between a first image and second subsequent image. In some embodiments, the motion filter unit 320 may determine the physical or virtual pose changes of the image sensor on a frame-by-frame basis. The motion filter unit may provide the determined physical and/or virtual pose changes of an image sensor to a per-line camera rotation calculation unit 322.

The per-line camera rotation calculation unit 322 may determine a rotation to perform to the image information on a line-by-line basis. The per-line camera rotation calculation unit 322 may provide information about the determined rotation to a transform matrix calculation unit 324.

The transform matrix calculation unit 324 may determine a transformation matrix for use in processing an image. The transform matrix calculation unit 324 may provide the transformation matrix to the rolling-shutter correction and warp unit 326.

The rolling-shutter correction and warp unit 326 may crop the image information, correct for distortions in the image caused by the lens 304, and may apply the transformation matrix to the image information. The rolling-shutter correction and warp unit 326 may provide as output a corrected image 328 based on the cropping, distortion correction, and/or application of the transformation matrix. In some embodiments, the corrected image may include an image having a corrected horizontal orientation or horizontal rotation. In some embodiments, the corrected image may include a stabilized video output.

Figure 4:
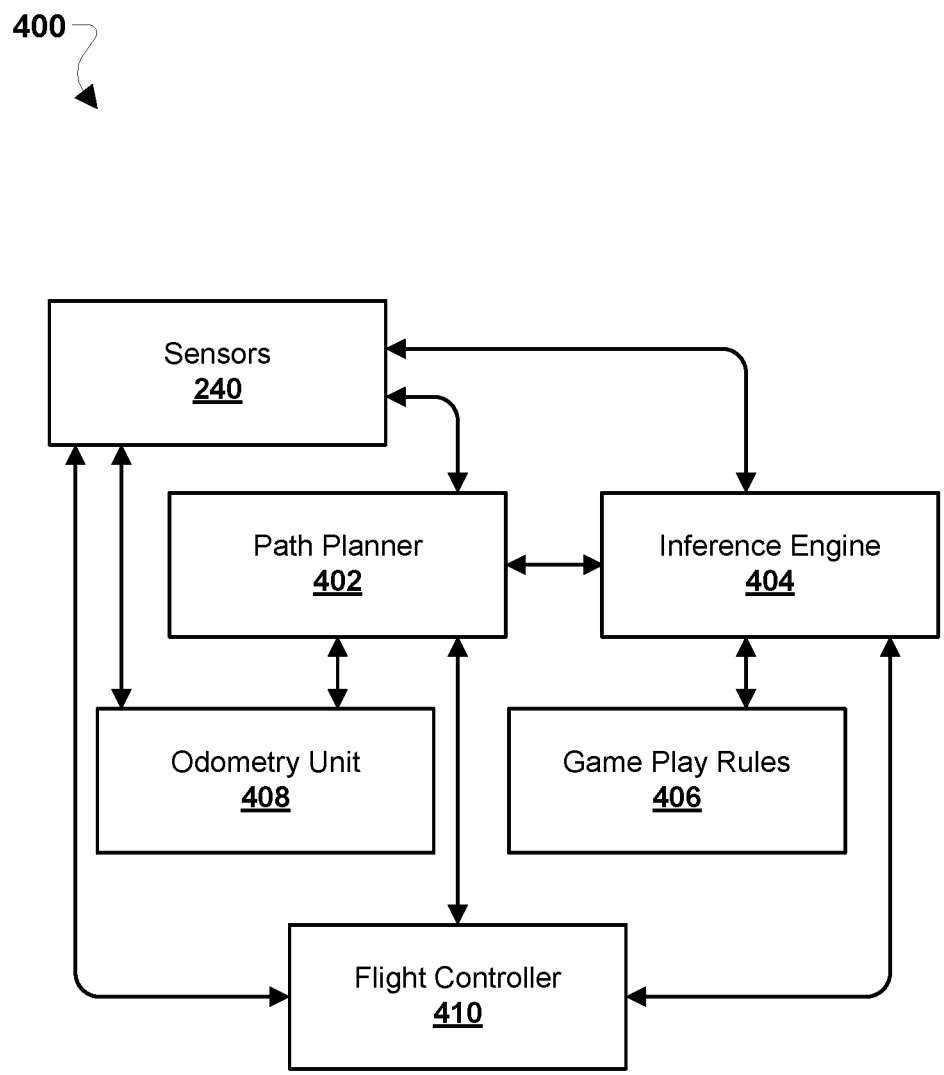
FIG. 4 is a component block diagram illustrating components of a game play image capture system of a UAV according to various embodiments.

FIG. 4 illustrates an image capture location determination system 400 of a UAV (e.g., 102, 200 in FIGS. 1 and 2) according to various embodiments. With reference to FIGS. 1-4, the image capture location determination system 400 may be implemented in hardware components and/or software components of the UAV, the operation of which may be controlled by one or more processors (e.g., the processor 220 and/or the like) of the UAV. The system 400 may include (but is not limited to) a path planner 402, an inference engine 404, a game play rules unit 406, an odometer unit 408, and a flight controller 410. The path planner 402, the inference engine 404, the odometer unit 408, and the flight controller 410 each may receive and/or exchange information from the one or more sensors 240, and may perform one or more operations using information from the one or more sensors 240. In some embodiments, the path planner 402, the inference engine 404, the odometer unit 408, and the flight controller 410 may execute or operate in parallel, using information from each other and from the one or more sensors 240 to perform one or more operations, as further described below.

In general, the system 400 may characterize a game context based on game play rules of the game, a location and/or movement of the game object, a location of one or more game players, a location of the UAV with respect to playing area boundaries and/or landmarks. The system 400 may predict the game action based on the characterized game context. For example, the system 400 may receive and/or determine information about the location of players, a ball, boundaries, and game play rules, and based on such information the system 400 may predict a next game action. In some embodiments, the prediction may include a probability assessment of what the next game action may be. In some embodiments, the prediction may include a probability of two or more next game actions. Based on the predicted next game action, the system 400 may calculate a position from which to capture an image of the game. In some embodiments, the system 400 may provide a path of motion for the UAV to a flight controller, which may move the UAV toward or to the calculated position. In some embodiments, the system 400 may select a second UAV to move toward or to the calculated position and to capture the image of the game. The system 400 may loop or iteratively determine information based on changing game conditions to calculate a next position from which capture an image of the game.

The path planner 402 may include a planning application that may perform calculations to plan a path of motion for the UAV within a volumetric space. For example, the path planner 402 may include a volumetric representation of space around the UAV, such as an "obstacle map" or a similar representation. The volumetric representation may include indications of objects, landmarks, etc. in the volumetric space. The path planner 402 may also include rules of motion of the UAV based on the volumetric representation. For example, the rules of motion may instruct the UAV to avoid objects and people instead of going through them, to predict the motion of objects and people within the volumetric space and plan the motion of the UAV to avoid them, and so forth. In some embodiments, the path planner 402 may determine the path of motion for the UAV based on a trigger condition, such as whenever the context of a game changes. A game context may change based on one or more occurrences within a game, such as when a game object encounters a landmark or boundary, when a player interacts with the game object, when the game object enters the goal area or passes a goal marker, or another similar occurrence within the game.

The path planner 402 may provide information about the planned path of the UAV, such as trajectory information, to the flight controller 410. In some embodiments, the flight controller 410 may determine based on information from the path planner and the inference engine 404. In some embodiments, the flight controller may include and/or be in communication with components such as the navigation unit 222 the gyro/accelerometer unit 226, and the avionics module 228. The flight controller 410 may calculate one or more flight instructions for the UAV to move the UAV toward or to the calculated position from which to capture the image of the game.

The path planner 402 may receive from the inference engine 404 a calculated position from which to capture the image of the game. The path planner 402 may provide information about the path of motion to the inference engine 404. In various embodiments, the path planner 402 and the inference engine 404 may iteratively exchange information to calculate the position from which to capture the image of the game and to determine the path of motion of the UAV. The path planner 402 may also provide information about the path of motion (e.g., trajectory information) to the flight controller 410.

The inference engine 404 may run or execute in parallel with the path planner 402. The inference engine 404 may determine the location of the game object, players, boundaries, landmarks, and other aspects of the playing area. The inference engine 404 may also receive game play rules from the game play rules unit 406. The inference engine 404 may characterize the game context based on the determined and/or received information. The inference engine 404 may predict a game action based on the characterized game context. In some embodiments, the predicted game action may include a probability assessment of what the next game action may be. In some embodiments, the prediction may include a probability of two or more next game actions. Based on the predicted game action, the inference engine 404 may calculate a position from which to capture an image of the game. In some embodiments, the calculated position may include a "best shot location" from which to capture a next image of the game. The inference engine 404 may provide to the path planner 402 the calculated position from which to capture the image of the game.

The odometer unit 408 may determine a position of the UAV in space. In some embodiments, the odometer unit 408 may determine a location of the UAV relative to the playing area (e.g., relative to one or more landmarks and/or boundaries of the playing area). The odometer unit 408 may provide such information to the path planner 402.

In some embodiments, the flight controller 410 may select a second UAV to move toward or to the calculated position and to capture the image of the game. For example, based on information from the path planner 402 and the inference engine 404, the flight controller 410 may determine that the UAV may be unable to reach the calculated location within a threshold period of time (e.g., soon enough to capture the next image of the game). In response to determining that the UAV is unable to reach the calculated location within the threshold period of time, the flight controller may select the second UAV to move toward, or to move to, calculated position and to capture the image of the game therefrom.

The system 400 may loop or iteratively determine information based on changing game conditions to calculate a next position from which capture an image of the game.

Figure 5A:
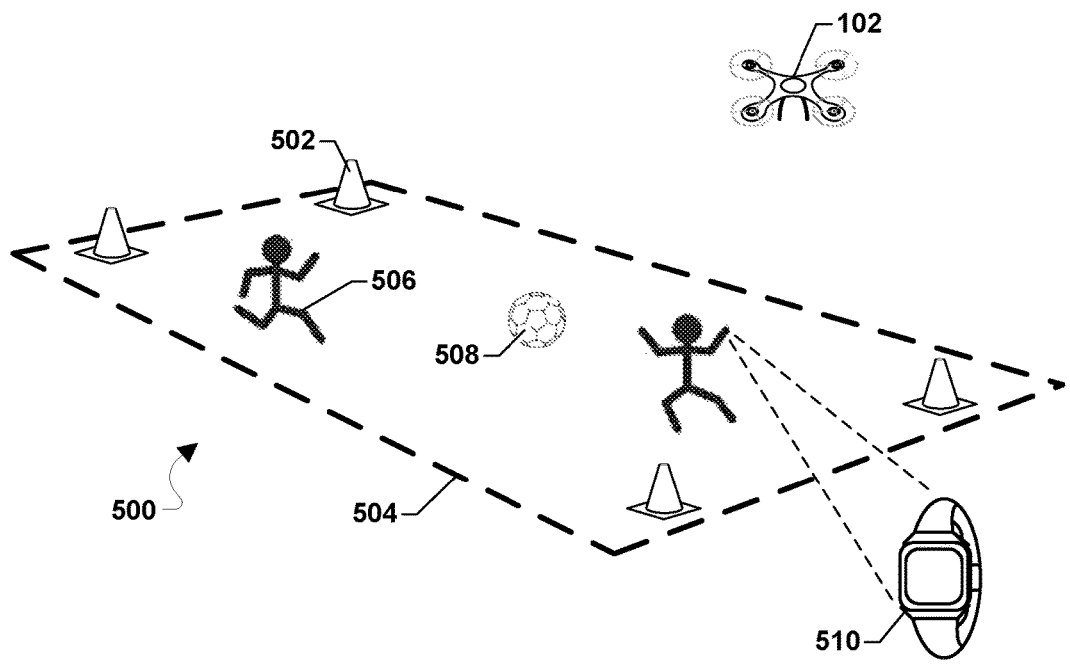
FIGS. 5A-5D illustrate game play areas according to various embodiments.
Figure 5B:
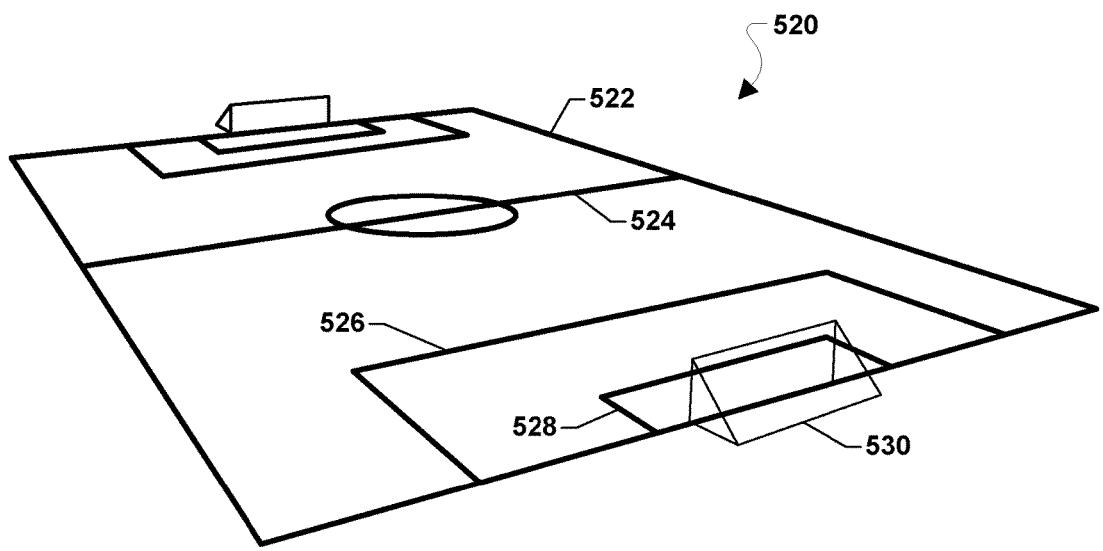
Figure 5C:
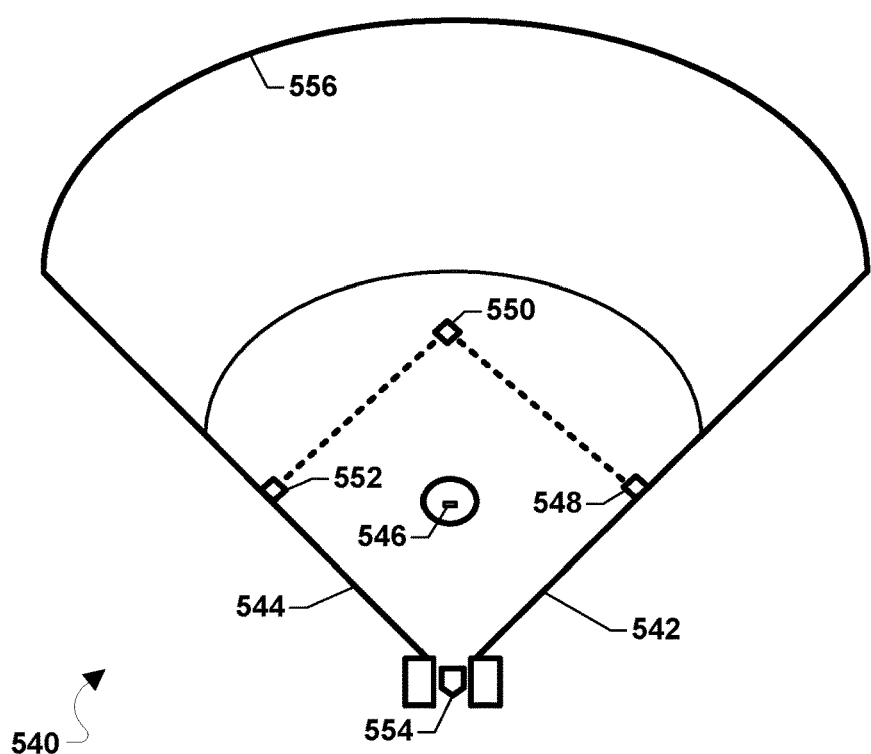
Figure 5D:
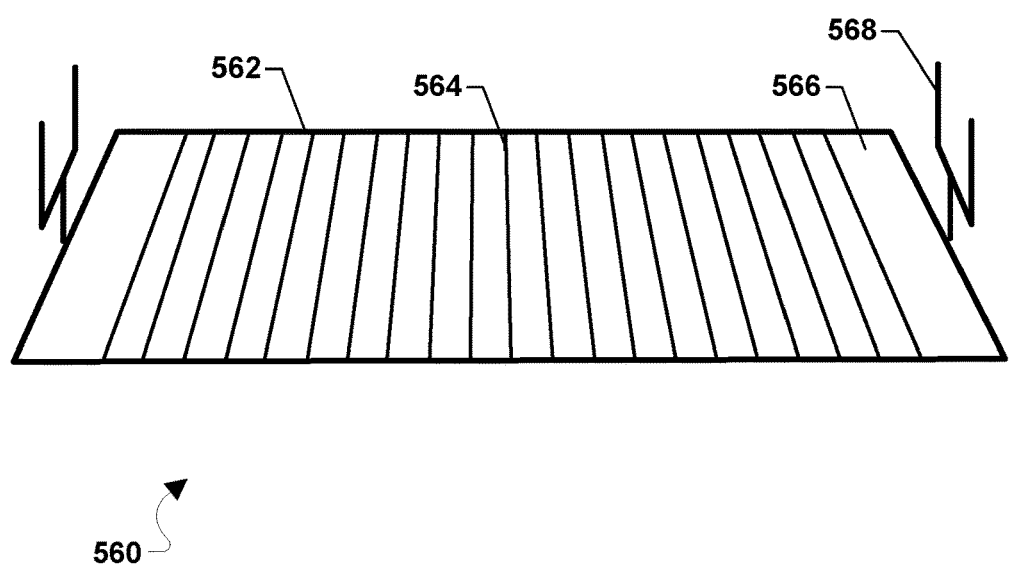

FIGS. 5A-5D illustrate game play areas 500, 520, 540, and 560 that may be recognized and within which a UAV (e.g., 102, 200 in FIGS. 1-2) may capture images of game play according to various embodiments. With reference to FIGS. 1-5D, the game play areas 500, 520, 540, and 560 may be similar to the game play area 120. FIG. 5A illustrates a generalized game play area 500. FIG. 5B illustrates a soccer game play area 520. FIG. 5C illustrates a baseball game play area 540. FIG. 5D illustrates an American football game play area 560.

With reference to FIGS. 1-5D, the game play area 500 may include landmarks 502 (e.g., game play area markers, such as cones or the like). In some cases, the game play area 500 may include a delineated boundary 504, such as lines on a field. In some cases, the game play area 500 may not include a clearly delineated boundary 504, and instead the boundary of the game play area 500 may be indicated by location of the game play area markers 502. One or more players 506 may move around the game play area 500 and may interact with a game object 508. In some embodiments, each player 506 may wear or otherwise be equipped with a device 510 (e.g., such as a transponder, a fitness band, a smart watch, or the like) that may broadcast, or respond to an interrogation signal with, a location of each player. The UAV 102 may detect the locations of the game play area markers 502 and/or the boundary 504, and may determine a location and motion of the players 506 (e.g., via the device 510 or the like) and the game object 508.

The soccer game play area 520 may include a boundary 522 and landmarks such as a halfway line 524, a penalty area boundary 526, a goal box boundary 528, and a goal 530. A UAV (e.g., the UAV 102) may detect the locations of the boundary 522 and the landmarks, game play area markers, 502 and/or the boundary 504, and may determine a location and motion of players and the game play object relative to the boundary 522 and the landmarks 524-530.

The baseball game play area 540 may include a boundary, such as a first base line 542 and a third base line 544, and landmarks, such as a pitcher's mound 546, a first base 548, a second base 550, a third base 552, a home plate 554, and a wall 556. A UAV (e.g., the UAV 120) may detect the locations of the boundaries and landmarks, and may determine a location and motion of players and the game play object relative to the boundaries and landmarks.

The football game play area 560 may include a boundary, such as an out of bounds line 562, and landmarks, such as one or more yard line markers 564, an end zone 566, and field goal uprights 568. A UAV (e.g., the UAV 102) may detect the locations of the boundaries and landmarks, and may determine a location and motion of players and the game play object relative to the boundaries and landmarks.

Figure 6:
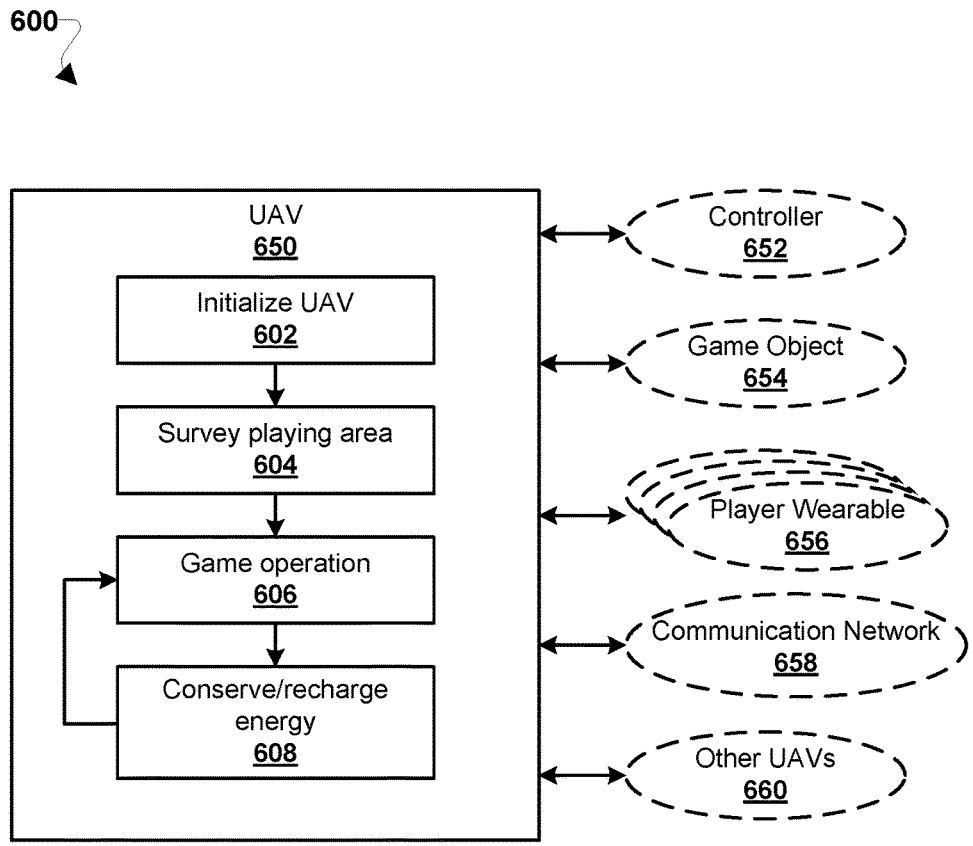
FIG. 6 is a process flow diagram illustrating a method of capturing images of a game by UAV according to various embodiments.

FIG. 6 illustrates a method 600 of capturing images of a game by a UAV 650 (which may be similar to the UAV 102, 200 in FIGS. 1 and 2) according to various embodiments. With reference to FIGS. 1-6, the method 600 may be implemented by a processor (e.g., the processor 220 and/or the like), which may control or execute the operations of one or more elements of the image capture location determination system 400.

In block 602, the processor may initialize the UAV 650. For example, the processor may perform initialization operations upon power up or reset of the UAV 650. In some embodiments, the processor may establish one or more wireless communication links during the initialization. For example, the processor may establish a wireless communication link with (but not limited to) a controller 652 (e.g., the wireless communication device 290), a game object 654 (e.g., the game object 508), one or more player wearable devices 656 (e.g., the device 510), a communication network 658 (e.g., the communication network 108), one or more other UAVs 660, and/or the like.

In some embodiments, establishing the wireless communication link with the one or more player wearable devices 656, in block 602, may include identifying each player and/or identifying, or assigning an identifier to, each player. For example, each player may be identified individually. As another example, each player may be assigned a team identifier.

In some embodiments, establishing the wireless communication link to the communication network 658, in block 602, may include establishing or initializing a live video stream from the UAV 655 to the communication network 658. For example, the live video stream may be accessible using a network-accessible streaming media or live streaming service.

In some embodiments, establishing the wireless communication link with the one or more of the UAVs 660, in block 602, may include configuring the UAV 650 and the one or more other UAVs to operate cooperatively to capture images of the game.

In some embodiments, during the initialization process in block 602, the UAV 650 may receive one or more inputs to provide information about the game to be imaged, such as a selection of a sport or a set of game play rules, to game duration, a skill level of the game, and other parameters.

In block 604, the processor may survey a playing area. For example, the processor may control the UAV 102 to capture one or more images of a playing area (e.g., the playing areas 500, 520, 540, and 560). In some embodiments, surveying the playing area may include invoking a process or set of behaviors of the processor of the UAV 102 to trigger a survey mode or one or more preprogrammed survey behaviors. In some embodiments, the UAV may survey the playing area by commencing flight and capturing images of the playing area while determining coordinates of sidelines, boundaries, goals, etc. by noting GPS coordinates and viewing angles of the UAV. For example, the UAV may determine a flight path to traverse a playing area while using camera images to detect a boundary and landmark(s), and noting the UAV's GPS coordinates while flying over boundaries and landmarks. In some embodiments, the processor may associate the detected boundary and landmark(s) with features of a playing area that correspond to the selected sport or game play rules. In some embodiments, the processor may determine one or more game play rules based on the boundary and/or landmark(s) that the processor detects during the survey. In some embodiments, the processor may determine one or more game play rules based on a lack of (or failure to detect) one or more of the boundary and/or landmark(s) during the survey. For example, if the processor does not detect a boundary (e.g., the boundary 504) or goal markers, the processor may determine one or more game play rules accordingly. An example of such a scenario is when a playing area is established using pylons to designate goal areas in an otherwise unmarked area, such as an open field. In such a case, the processor may extrapolate a boundary and goal areas formed by virtual lines between two pylons using, for example, relative locations of and distances between the pylons.

In block 606, the processor may perform one or more game operations. For example, the processor may determine the location of the game object, determine locations of players, characterize a game context, predict game actions, calculate positions from which to capture an image of the game, and calculate a path of motion of the UAV to the calculated position, as further described below.

In block 608, the processor may perform operations to conserve or recharge energy. For example, the UAV 650 may determine that a stored power level (e.g., of the power module 230) has reach a threshold power level (e.g., a low-power threshold). In some embodiments, in response to determining that the stored power level meets the threshold power level, the UAV 650 may navigate to a charging station to recharge the onboard battery. In some embodiments, in response to determining that the stored power level meets the threshold power level, the processor may instruct another UAV 660 to perform one or more operations being performed by the UAV 650, and thus the UAV 650 may "swap" functions or operations with one of the other UAVs 660. In response to determining that the stored power level does not meet the threshold power level (i.e., has sufficient stored energy), the processor may continue to perform one or more game operations in block 606.

Figure 7:
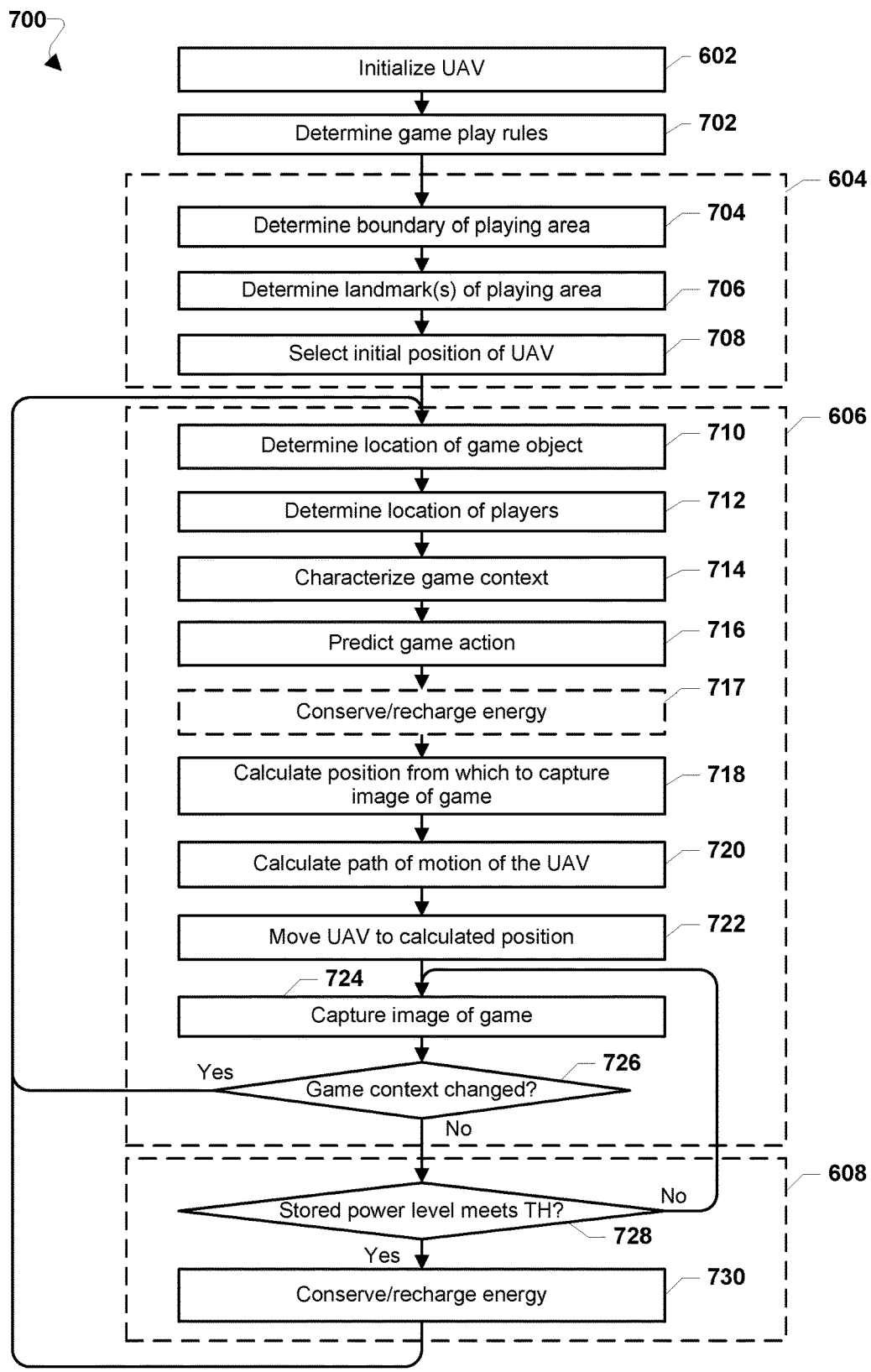
FIG. 7 is a process flow diagram illustrating a method of capturing images of the game by a UAV according to various embodiments.
Figure 8:
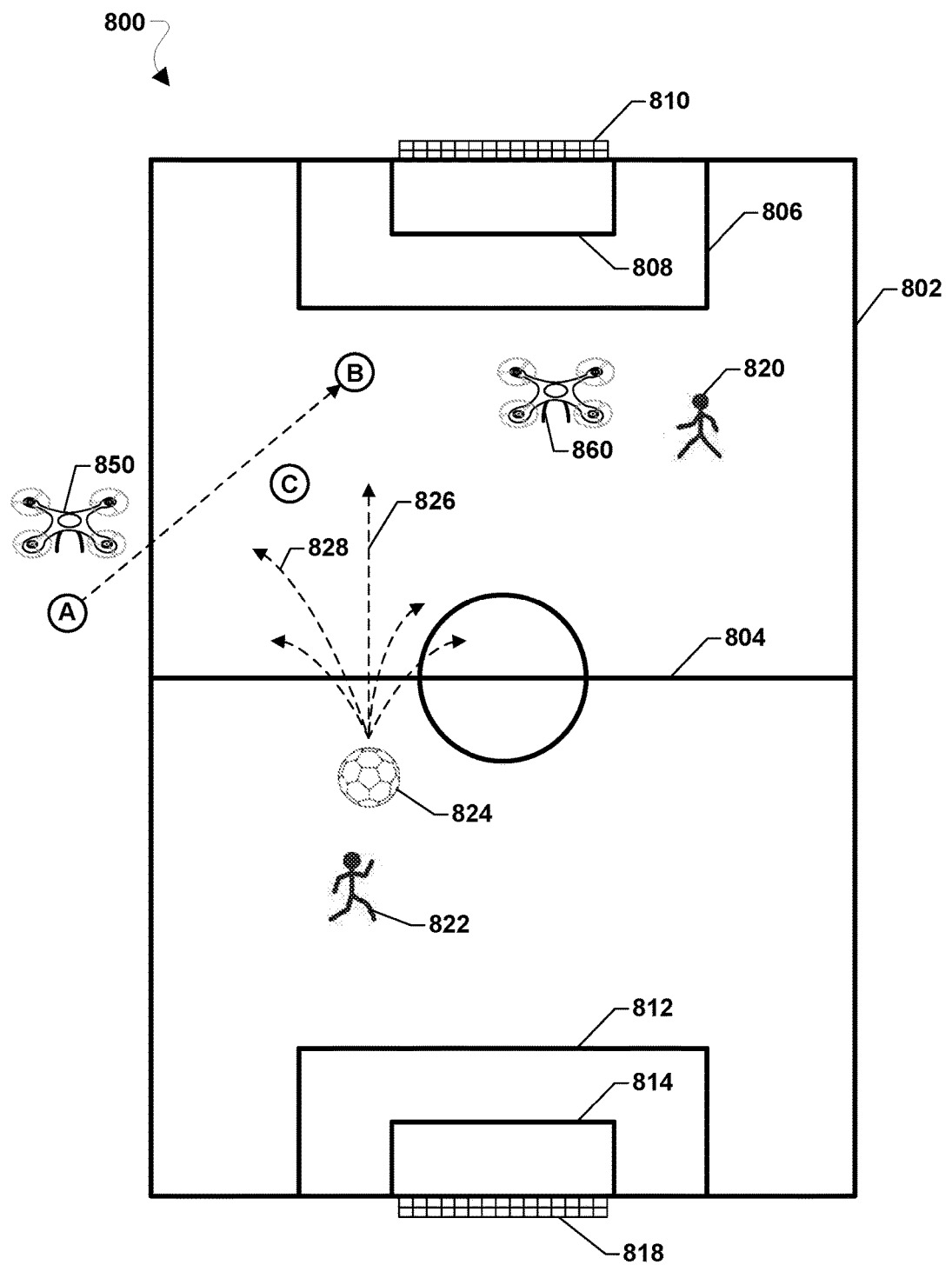
FIG. 8 is a schematic diagram illustrating a method of capturing images of the game by a UAV according to various embodiments.

FIGS. 7 and 8 illustrate a method 700 of capturing images of a game by a UAV 850 (which may be similar to the UAV 102, 200, and 650 in FIGS. 1, 2, and 6) according to various embodiments. With reference to FIGS. 1-8, the method 700 may be implemented by a processor (e.g., the processor 220 and/or the like), which may control or execute the operations of one or more elements of the image capture location determination system 400. In blocks 602-608, the device processor may perform operations of like-numbered blocks of the method 600.

In block 702, the processor may determine game play rules. In some embodiments, the processor may receive a user input selecting from among one or more sets of rules for games, such as soccer, baseball, football, basketball, tennis, hockey, or another commonly played game. In such embodiments, based on the received input, the processor may retrieve from memory a set of rules for the selected game.

In some embodiments, the processor may recognize a game based on features and dimensions of the playing area matching or corresponding to stored features and dimensions of known playing areas, such as recognizing a soccer pitch, baseball diamond, football field, basketball court, etc.

In such embodiments, the processor may retrieve from memory a set of rules for the recognized game. In such embodiments, the processor may perform the operations of block 702 after performing the operations of one or more of blocks 704 and 706, as further described below.

In some embodiments, the processor may receive a user input instructing the processor to determine the game play rules based on a survey of the playing area (e.g., a "free play" or "open play" mode selection). In such embodiments, the processor may perform the operations of block 702 after performing the operations of one or more of blocks 704 and 706, as further described below.

Blocks 704-708 provide examples of operations that may be performed in block 604 of the method 600.

In block 704, the processor may determine a boundary of the playing area. For example, the processor may determine the boundary 802 of the playing area 800 based on the survey of the playing area. In some embodiments, the boundary 802 may be similar to the boundary 504, 522, 542, 544, and/or 562.

In block 706, the processor may determine one or more landmarks of the playing area. For example, the processor may determine one or more of the landmarks 804-818 of the playing area 800. In some embodiments, landmarks 804-818 may be similar to one or more of the landmarks 502, 524-530, 542-556, and/or 564-568.

In some embodiments, the processor may determine the boundary or one or more landmarks based on the survey and the game play rules. For example, while the game play rules may specify a selected sport (e.g., soccer), the processor may adapt or adjust the game play rules based on the determined locations of the boundaries or landmark(s) (e.g., actual size of field, presence and/or location of goals, etc.).

In block 708, the processor may select an initial position for the UAV. The processor may select the initial position based on the game play rules and one or more of the survey of the playing area, the boundary of the playing area, and the landmark(s) of the playing area. For example, the processor may select position "A" as the initial position. In some embodiments, the processor may move the UAV (e.g., the UAV 850) to the selected initial position.

Blocks 710-726 provide examples of operations that may be performed in block 606.

Blocks 710-726 provide examples of operations that may be performed in block 606.

In block 710, the processor may determine a location of a game object. For example, the processor may determine a location of the game object 824 (e.g., a soccer ball). In some embodiments, an inference engine (e.g., the inference engine 404) may determine a location of the game object 824.

In block 712, the processor may determine a location of players. In some embodiments, the inference engine may determine the location of the players. For example, the processor may determine a location of players and 820 and 822. In some embodiments, the processor may determine a motion of each of the players and 820 and 822. In some embodiments, the processor may determine an identity of each of the players 820 and 822. In some embodiments, the processor may use information detected during the survey of the playing area, or at any other time, to determine a team affiliation of each of the players 820 and 822. In some embodiments, the processor may determine a team affiliation of the players 820 and 822 based upon their positions within the playing area. For example, in soccer, the processor may determine a team affiliation based on which side of the center line each player stands at the start of play. As another example, in baseball, the processor may determine a team affiliation based on the dugout area in which each player is standing. In some embodiments, the processor may detect information, such as uniform colors and/or designs, or other visual indicators of a team affiliation and may use such information to determine a player's team affiliation. In some embodiments, the processor may determine an identity of each of the players 820 and 822 based on information provided by each of the players, for example, from a device worn or held by each of the players (e.g., the device 510), and may use such information to determine a player's team affiliation.

In block 714, the processor may characterize the game context. In some embodiments, the inference engine may characterize the game context. The processor may determine the game context based on the game play rules and the location and/or motions of the game object 824 and the players 820 and 822 relative to the boundary 802 and the landmarks 804-818. In some embodiments, the processor may characterize the game context based on the location of the UAV 850 with respect to one or more of the boundary 802, the landmarks 804-818, the game object 824, and the players 820 and 822. In some embodiments, the processor may characterize the game context based on an interaction between one or more of the players 820 and 822 with the game object 824 and/or the relative location and/or motion of the players and 820 of 822 relative to the boundary 802 and/or the landmarks 804-818.

In some embodiments, the processor may characterize the game context based on other observed actions in the game. For example, the processor may detect that a referee, umpire, or other game adjudicator has declared a penalty. For example, the processor may detect that a soccer referee is displaying a yellow or red card. As another example, the processor may determine that an American football referee has thrown a yellow flag. As another example, the processor may determine that game play has stopped and that two or more referees, umpires, or other adjudicators are conducting a conference (e.g., are speaking to each other in close proximity while game play is stopped).

In block 716, the processor may predict a game action. In some embodiments, the inference engine may predict the game action. In various embodiments, the processor may predict the game action based on the characterized game context and the game play rules. In some embodiments, the processor may predict the game action based on the game play rules and the relative location of the game object 824 to one or more of the players 820, 822, the boundary 802, playing field/court lines 804, 806, 808, 812, 814, and the landmarks 810, 818. In some embodiments, the prediction may include a probability assessment of the most likely next game action. For example, the processor may determine that one game action has a probability that is greater than other game actions by a probability threshold. In some embodiments, the prediction may include a probability assessment of two or more next game actions.

For example, for a game of soccer, based on the applicable game play rules the processor may determine that the game object is out of play and play will stop temporarily if the game object 824 passes the boundary line 802 on either side of the playing area 800. Further, based on which team last touched the game object 824, the processor may determine that the other team will throw the game object 824 in from the location at which the game object 824 passed the boundary line 802. However, if the game object 824 passes the boundary line 802 on either end of the playing area 800, based on which team last touched the game object 824, the processor may determine that the game object 824 will be kicked into play either from a corner of the playing area 804 or from a corner of one of the landmarks 806 or 812. Similarly, the processor may determine that if the game object 824 enters one of the landmarks 810 or 818 (e.g., a goal) then certain game actions will likely occur, such as temporary stoppage of game play, a celebration by one or more players of the scoring team (and/or their fans in attendance), and displays of negative emotion by the opposing team (and/or their fans in attendance). Further, the processor may determine that following such actions, game play will resume at the halfway line 804.

As another example for the game of American football, the processor may apply the relevant game play rules and predict the game action based on the characterized game context. For example, the processor may detect various players of each team lined up and facing each other, and the processor may determine that a game play action is about to begin. The processor may detect the motion of a game object (e.g., a football) in the hands of a quarterback. The processor may track the motion of the game object when the quarterback throws the game object to a receiver down the field. The processor may also determine whether the receiver catches the game object or misses the game object. The processor may also determine motion of the receiver if the receiver catches the game object, such as whether the receiver runs out of bounds, is tackled on the field, or runs into an end zone. The processor may further determine a next game play based on one or more of those conditions. For example, if the receiver misses the game object, then the processor may determine that a next game action will occur where the teams lined up for the previous play. As another example, if the receiver catches the game object, the processor may monitor game action to determine whether the receiver runs out of bounds, is tackled, or scores. Based on the monitored game action, the processor may determine a next game play. For example, if the receiver scores, the processor may determine that the next game action will be a celebration by one or more players in the end zone (and/or their fans in attendance). As another example, if the receiver is tackled or runs out of bounds, the processor may determine that the next game action will occur at a location on the playing area determined by the location of the tackle or where the receiver ran out of bounds.

In optional block 717, the processor may take an action to conserve energy or recharge a battery. For example, the processor may monitor a stored power level of the UAV, compare the level to a threshold level at which an action should be taken, and take an action to conserve energy or recharge a battery in response to the stored power level reaching or falling below the threshold level. In some embodiments, actions to conserve energy may include temporarily landing (e.g., between plays or during timeouts). In some embodiments, actions to recharge the battery may include flying to a recharge station or to an operator for a battery change. In some embodiments, the processor may check the stored power level when the game context has changed.

In some embodiments, the processor may take the action to conserve or recharge energy based on the predicted game action. For example, if a goal is scored in a soccer game, game play may pause temporarily while players celebrate and game play moves to center field. The processor may determine a likely duration of the temporary stoppage. Based on the likely duration of the temporary stoppage, the processor may maneuver the UAV to recharge its power storage if there is sufficient time, or maneuver the UAV to land at a nearby location temporarily to conserve power if the likely stoppage duration is insufficient to permit the UAV to recharge its stored power. In some embodiments, the processor may generate a highlight video (as further described below) while the drone is conserving power or recharging, and therefore may generate a video stream or livestream even while temporarily landed.

In block 718, the processor may calculate a position from which to capture an image of the game. In some embodiments, the inference engine may calculate the position from which to capture the image of the game. The position may include a camera angle from which to capture video of the game. The processor may calculate the position based on the predicted game action. For example, based on the game context, the processor may determine that the most likely next game action is that the player 822 will kick the game object 824 along path 826. Based on the prediction that the game object 824 will be kicked along the path 826, the processor may calculate position "B" from which to capture an image of the game. The processor may use the game play rules and the characterized game context to calculate the position from which to capture an image of the game. In some embodiments, the processor may use the game play rules and one or more of the relative location of the game object 824 to one or more of the players 820 and 822, the boundary 802, and the landmarks 804-818 to calculate the position from which to capture an image of the game.

In a case where the predicted game action includes two or more probable next game actions, the processor may use the two or more probable next game actions to determine the position from which to capture the image of the game. For example, the processor may determine that the game object 824 may move along either path 826 or path 828 with respective probabilities that are within a threshold probability of each other. The processor may then calculate position "C", between the paths 824 and 826, from which to capture an image of the game.

In block 720, the processor may calculate a path of motion of the UAV. In some embodiments, a path planner (e.g., the path planner 402) may calculate the path of motion. In some embodiments, the processor may determine a path of motion from the present location of the UAV (e.g., the UAV 850) to the calculated position from which to capture the image of the game. The calculated path of motion may include a speed of motion. In some embodiments, the processor may use one or more of the location and/or motion of the game object 824 and the one or more of the players 820 and 822 to calculate the path of motion.

In block 722, the processor may move the UAV to the calculated position. In some embodiments, the processor may provide the calculated path of motion of the UAV to a flight controller (e.g., the flight controller 410), and the flight controller may control flight operations of the UAV to the calculated position.

In block 724, the processor may capture an image (or video) of the game. In some embodiments, the processor may capture the image of the game from the calculated position, or from as close to the calculated position as possible.

In determination block 726, the processor may determine whether the game context has changed. In some embodiments, the inference engine may determine whether the game context is changed. For example, the processor may determine whether the game context has changed based on one or more of a game action, the position and/or relative positions (i.e., compared to each other) of the game object 824, the players 820 and 822, the boundary 802, and/or the landmarks 804-818.

In response to determining that the game context has changed (i.e., determination block 726="Yes"), the processor may again determine the location of the game object in block 710.

Blocks 728 and 730 provide examples of operations that may be performed in block 608 of the method 600.

In response to determining that the game context has not changed (i.e., determination block 726="No"), the processor may determine whether a stored power level meets a power level threshold ("TH") in determination block 728.

In response to determining that the stored power level does not meet the power level threshold (e.g., determination block 728="No"), the processor may again capture an image of the game in block 724.

In response to determining that the stored power level meets the power level threshold (e.g., determination block 728="Yes"), the processor may take an action to conserve or recharge energy in block 730. For example, the processor may temporarily land the UAV to reduce power demands and/or cause another UAV to take over imaging the game. In some embodiments, the processor may navigate the UAV to a recharging station to recharge a power storage (e.g., a battery) of the UAV.

Figure 9:
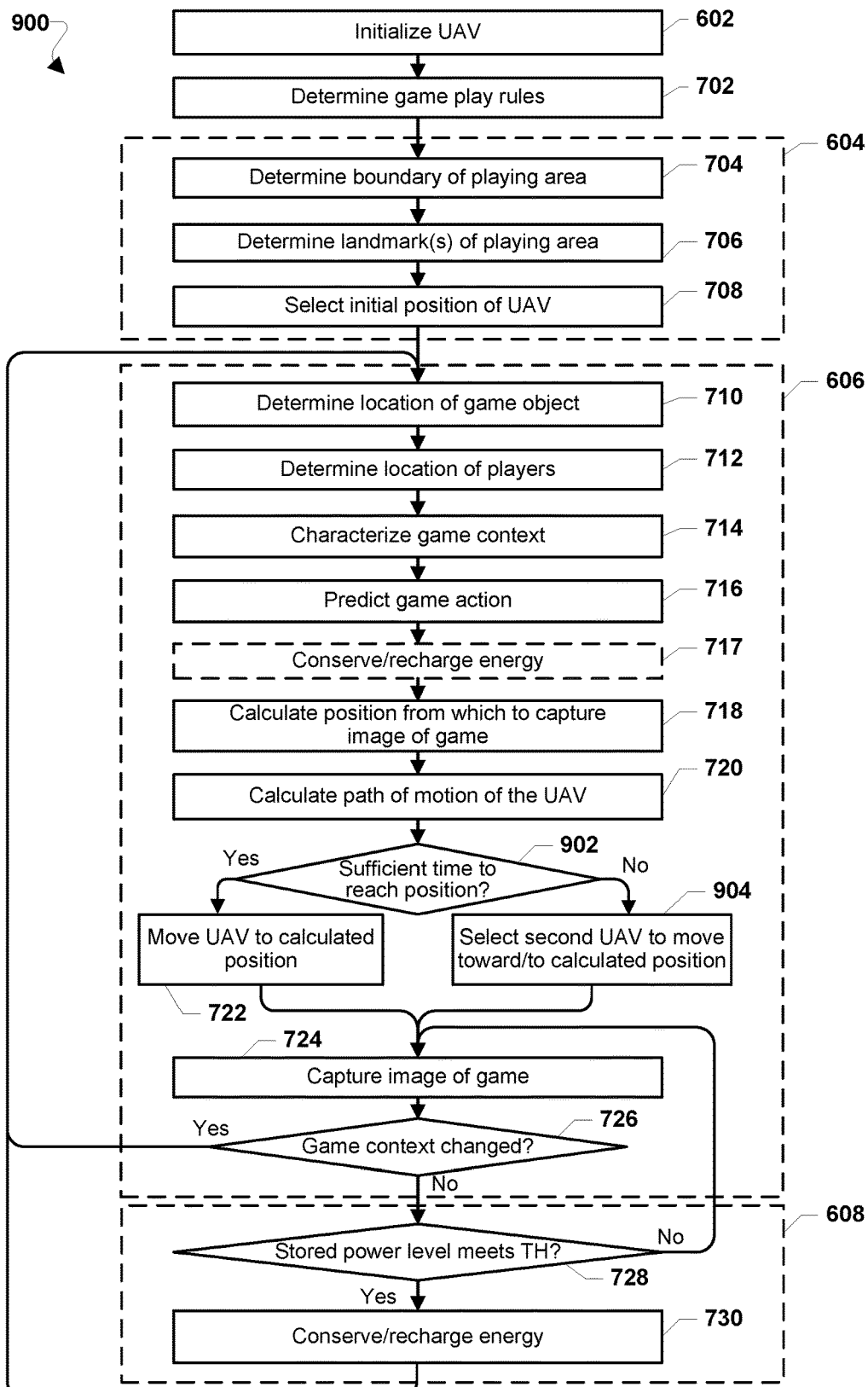
FIG. 9 is a process flow diagram illustrating a method of capturing images of the game by a UAV according to various embodiments.

FIG. 9 illustrates a method 900 of capturing images of a game by a UAV (e.g., 102, 200, 650, 850 in FIGS. 1, 2, 6, and 8) according to various embodiments. With reference to FIGS. 1-9, the method 900 may be implemented by a processor (e.g., the processor 220 and/or the like), which may control or execute the operations of one or more elements of the image capture location determination system 400. In blocks 702-730, the device processor may perform operations of like-numbered blocks of the method 700 as described.

In determination block 902, the processor may determine whether there is sufficient time for the UAV to reach the calculated position.

In response to determining that there is sufficient time for the UAV to reach the calculated position (i.e., determination block 902="Yes"), the processor may move the UAV to the calculated position in block 722.

In response to determining that there is not sufficient time for the UAV to reach the calculated position (i.e., determination block 902="No"), the processor may select a second UAV to move toward to the calculated position in block 904. For example, the UAV 850 (in FIG. 8) may determine that there is not sufficient time to move from position "A" to position "B", and, as such, may request a second UAV 860 to move toward or to position "B". In some embodiments, the processor may select the second UAV 860 from among a plurality of UAVs based on, for example, proximity to the calculated position.

In some embodiments, the processor may use one or more other conditions instead of, or in addition to, time to reach the calculated position in performing the operations of determination block 902. For example, the processor may determine whether the distance between the current position of the UAV and the calculated position is greater than a threshold distance. In response to determining that the calculated position is less than the threshold distance, the processor may move the UAV to the calculated position in block 722. In response to determining that the calculated position is greater than the threshold distance, the processor may select the second UAV to move toward or to the calculated position in block 904.

As another example, the processor may determine whether an amount of stored power (e.g., battery power) required for the UAV to travel to the calculated position exceeds a threshold. In response to determining that the amount of stored power required is less than the threshold, the processor may move the UAV to the calculated position in block 722. In response to determining that the amount of stored power required is greater than a threshold, the processor may select the second UAV to move toward or to the calculated position in block 904.

As another example, the processor may determine whether an amount of stored power is below a threshold. In response to determining that the amount of stored power is above the threshold, the processor may move the UAV to the calculated position in block 722. In response to determining that the amount of stored power is below the threshold, the processor may select the second UAV to move toward or to the calculated position in block 904. In some embodiments, in response to determining that the amount of stored power is below the threshold, the UAV may also take an action to conserve or recharge energy (e.g., as described regarding the operations of block 730).

Figure 10:
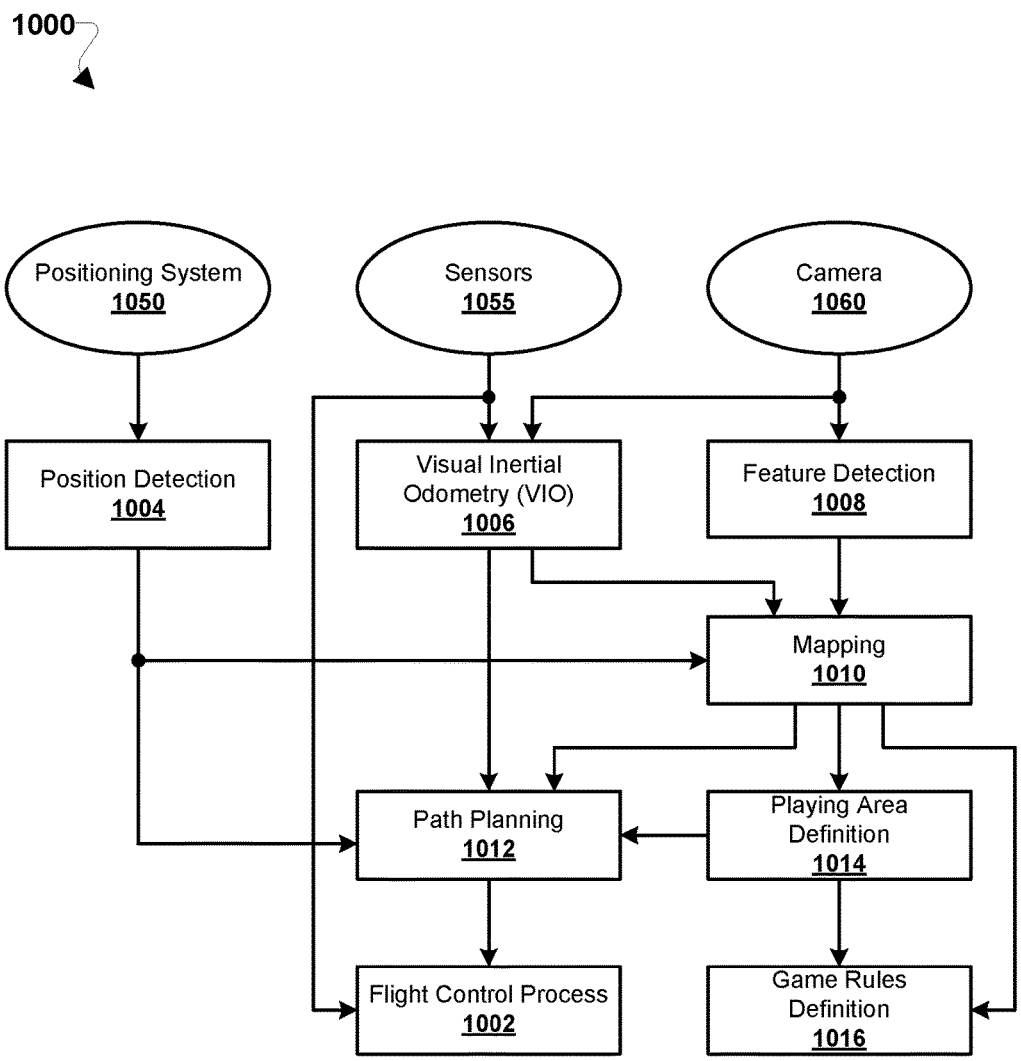
FIG. 10 is a data flow diagram illustrating data flows from data sources through processing stages and units for surveying a playing area by a UAV according to various embodiments.

FIG. 10 illustrates data flows from data sources through processing stages and units for implementing a method 1000 of surveying a playing area by a UAV (e.g., 102, 200, 650, 850 in FIGS. 1, 2, 6, and 8) according to various embodiments. With reference to FIGS. 1-10, the method 1000 may be implemented by a processor (e.g., the processor 220 and/or the like), which may control or execute the operations of one or more elements of the image capture location determination system 400. In some embodiments, the method 1000 includes one or more operations that may be performed as part of block 604 of the method 600.

The method 1000 may include a plurality processes for surveying the playing area. A flight control process 1002 may stabilize the UAV, and may navigate the UAV according to a calculated path of motion. A position detection process 1004 may detect a position of the UAV, for example, using information from a positioning system, such as a global positioning system (GPS) 1050.

A visual inertial odometer (VIO) process 1008 may calculate a current position of the UAV based on information from based on information from one or more sensors 1055 (e.g., a gyroscope, an accelerometer, a barometer, a magnetometer, etc.) and/or from a camera 1060 (e.g., an image sensor). The VIO process 1006 may calculate the current position of the UAV in six degrees of freedom. For example, the VIO process 1055 visual information, such as optical flow or feature tracking information, with inertial information, such as information from an accelerometer or gyroscope. The VIO process 1055 may also combined distance to ground information, such as ultrasound range measurements, or 3-D depth or disparity data. In some embodiments, the VIO process 1055 may calculate a position that is more precise and/or more frequently updated, than a GPS-based position determining process.

A feature detection process 1008 may utilize information from a camera or 3-D camera (e.g., a stereo camera, a structured light camera, or a time of flight camera, in embodiments in which the UAV is so equipped) to calculate 3-D depth or disparity data. The feature detection process 1008 may determine boundaries and/or landmarks of a playing area, including lines, pylons, goalposts, nets, hoops, and other similar landmarks. The feature detection process 1008 may also detect players in the playing area. In some embodiments, the feature detection process 1008 may use a segmentation process to segment potential features, and a feature classification process to classify each potential feature. In some embodiments, the feature classification process may use a deep learning neural network, which may be trained off-line on aerial imagery of common features that may be found in a variety of playing areas.

A mapping process 1010 may algorithmically project 3-D depth or disparity data into a 3-D map. In some embodiments, the projection may use 6 degrees of freedom information (i.e., X, Y, Z, pitch, roll, and yaw) that may be determined by the VIO process 1006. In some embodiments, the 3-D map may represent obstacles as well as changes in ground elevation. The mapping process 1010 may further project 2-D image data into the 3-D map using the six degrees of freedom information as well as the mapped 3-D position intersected by the 2-D image data's projected ray. The mapping process 1010 may further project detected and classified features into the 3-D map using the 6 degrees of freedom information and the mapped 3-D position intersected by the 2-D feature's projected ray. In some embodiments, for example, in UAVs that do not include a 3-D camera, the mapping process 1010 may project 2-D image data or detected and classified features onto a ground plane of a map. In some embodiments, the mapping process 1010 may stitch 2-D image data into a map, whereby the map is an image.

A path planning process 1012 may generate an initial flight plan, and may regenerate the flight plan as features and obstacles are detected. For example, the UAV may be launched from a location near one sideline of a playing area. The path planning process 1012 may generate an initial flight path that follows an expanding spiral. The UAV may detect obstacles such as bleachers, trees, etc., and the path planner process 1012 may regenerate the flight path to avoid those detected obstacles, and to expand the area to be surveyed in other directions. As another example, the UAV may detect a goalpost, and may regenerate the flight path to be sent to the spiral pattern relative to the detected goalpost.

A playing area definition process 1014 may generate a definition of the playing area based on relative positions of the boundaries and/or landmarks of the playing area within the map, as well as obstacles and changes in ground elevation. For example, in a stadium, the playing area definition process 1014 may compare detected features, such as lines in goalposts, with a playing area model stored in a memory of the UAV, and may define positions of the goals, sidelines, and other landmarks based on the detected features. As another example, at a soccer field in a park, the playing area definition process 1014 may define detected goalposts and pylons as goals and corners of the playing area, respectively, based on the comparison with a soccer field model stored in memory. As another example, in a backyard, the playing area definition process 1014 may define a detected pair of pylons as goalposts. In this example, the definition of the playing area may be incomplete, because the definition may not include defined corners, sidelines, or other landmarks of the playing area. As another example, the UAV may recognize a basketball net attached to a garage in a captured image, and the playing area definition process 1014 may define a detected change in ground appearance (e.g., edges of the driveway) with a boundary of the playing area.

A game play rules definition process 1016 may generate game play rules. In some embodiments, the game play rules may include a superset of game play rules. In some embodiments, the generated game play rules may be based on the defined playing area, a playing area model that be surveyed playing area best matches, a type of game object (e.g., a smart ball) or other sports apparatus with which the UAV has established wireless communication, a number of players (e.g., as may be the UAV may detect visually or based on information from wearable devices associated with one or more players), landmarks, and changes in elevation identified in the map, as well as a classification of the playing area. In some embodiments, a superset of game play rules may include all possible rules for all sports. In some embodiments, a set of game play rules may include the most probable rules for a sport, and the processor may select such rules based on inferences that the UAV may derive from the playing area, the location of the playing area (e.g., a country, a stadium, a backyard, a park, a driveway, etc.), information from the game object, and/or information from or about the players (e.g., a number of players, information provided by player wearable devices, etc.). In some embodiments, the UAV may customize the game play rules based on the defined playing area, location, number of players, and other parameters.

In some embodiments, the game rules definition process 1016 may modify or adjust the game play rules based on features of the playing area that are detected, or that are not detected. For example, at a soccer field in a park, the generated playing area definition may not include any detected features associated with a goal crease, and the game rules definition process 1016 may exclude from the relevant game play rules any rules associated with the goal crease. As another example, in a backyard, although a generated playing area definition may not include any detected features associated with corners or sidelines of a playing area (e.g., a boundary), the game rules definition process 1016 may nonetheless generate "out of bounds" rules based on obstacles, changes in elevation, and other features identified in the map. As another example, for basketball net attached to a garage, game rules definition process 1016 may generate game play rules for half-court basketball, based on the detection of only the single basketball hoop.

In some embodiments, the game rules definition process 1016 may modify or adjust the game play rules based on a classification of the playing area location (e.g., a stadium, a park, a street, a swimming pool, etc.). For example, the UAV may classify a location as a stadium, and the game rules definition process 1016 may infer that players will play by full and proper rules of the relevant or selected sport. As another example, the UAV may classify a location as a park, and of the game rules definition process 1016 may modify or adjust relevant game play rules to be more casual, such as by selecting a more basic or reduced set of rules from a superset of game rules. As another example, the UAV may classify the playing area as the street, and the game rules definition process 1016 may modify or adjust the game play rules to account for the possibility of a moving automobile or other vehicle in the playing area.

In some embodiments, the game rules definition process 1016 may modify or adjust the game play rules based on a number of players detected in the playing area. For example, the UAV may determine that the game is rugby (e.g., based on information from a smart rugby ball), and the UAV may detect 14 players instead of 30 players. The game rules definition process 1016 may modify a superset of rugby rules to select a subset of rules that may be applicable to, for example, Rugby Sevens. In contrast, the UAV may detect 30 players, and for a game identified as rugby, the UAV may apply a fuller set of applicable game rules, such as the game rules applicable to Rugby Union.

In some embodiments, the UAV may request confirmation of a playing area definition and the game rules definition from a user. In some embodiments, the UAV may transmit the map and/or provide a visual representation of the map to be displayed, e.g., on a controller. In some embodiments, the visual representation may include the stitched image or 2-D image data that was projected into the map. In some embodiments, the playing area definition may be graphically overlaid onto the map. For example, the map may include a feature such as a tree highlighted in red to indicate that the tree is defined as out of bounds in the game play rules. In some embodiments, the UAV may provide a high level summary of the game play rules (e.g., in text or graphic form). For example, the UAV may display a sport name or icon (e.g., a picture of the game object) that the game rules definition process 1016 may select. In some embodiments, the UAV may provide a user one or more options to accept the definitions of the playing area and/or the rules, and or to edit them. In some embodiments, an editing process may enable the processor of the UAV and/or a controller to receive an input to change definitions of playing area boundaries, landmarks, and other features.

Figure 11:
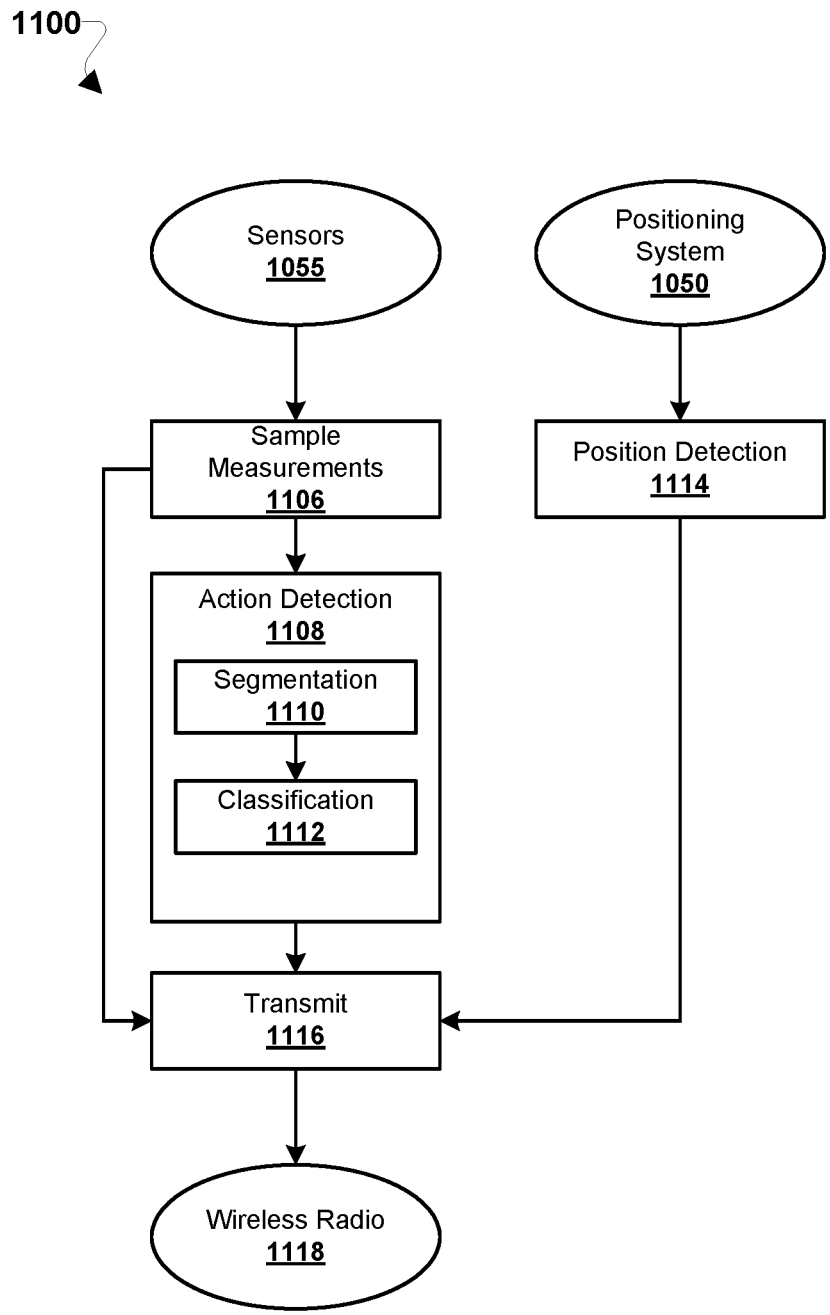
FIG. 11 is a data flow diagram illustrating data flows from data sources through processing stages and units for providing information from game equipment to a UAV according to various embodiments.

FIG. 11 illustrates data flows from data sources through processing stages and units for implementing a method 1100 of providing information from game equipment to a UAV (e.g., 102, 200, 650, 850 in FIGS. 1, 2, 6, and 8) according to various embodiments. With reference to FIGS. 1-11, the method 1100 may be implemented by a processor of a game object (e.g., the game object 508, 824) and/or a processor of a wearable device worn by a player (e.g., the device 510).

The method 1100 may include a plurality processes for providing the information from the game equipment. A processor may take one or more sample measurements 1106 based on, for example, information from one or more of the sensors 1055 (e.g., a gyroscope, an accelerator, a barometer, a magnetometer, etc.).

An action detection process 1108 may detect one or more actions based on the sample measurements. For example, the action detection process 1108 running in a smart ball or other game object may detect a ball being kicked, a basketball being dribbled, etc. As another example, the action detection process 1108 running in a player wearable device may detect other player actions (e.g., steps, kicks, throws, dribbles, etc.). The action detection process 1108 may include a segmentation process 1110 and a classification process 1112. The segmentation process 1110 may segment repetitive motions were possible. In some embodiments, the segmentation process may execute an autocorrelation algorithm. The classification process 1112 may classify detected motions as certain actions. In some embodiments, the classification process 1112 may execute an L2 linear support vector machine (SVM) algorithm.

In some embodiments, a position detection process 1114 may detect a position of the game equipment. In some embodiments, the position detection process may use information from the positioning system 1050 (e.g., a GPS system, and indoor positioning system, etc.) to detect the position of the game equipment.

A transmit process 1116 may transmit the detected actions and/or position of game equipment via a wireless radio 1118 to a UAV.

Figure 12:
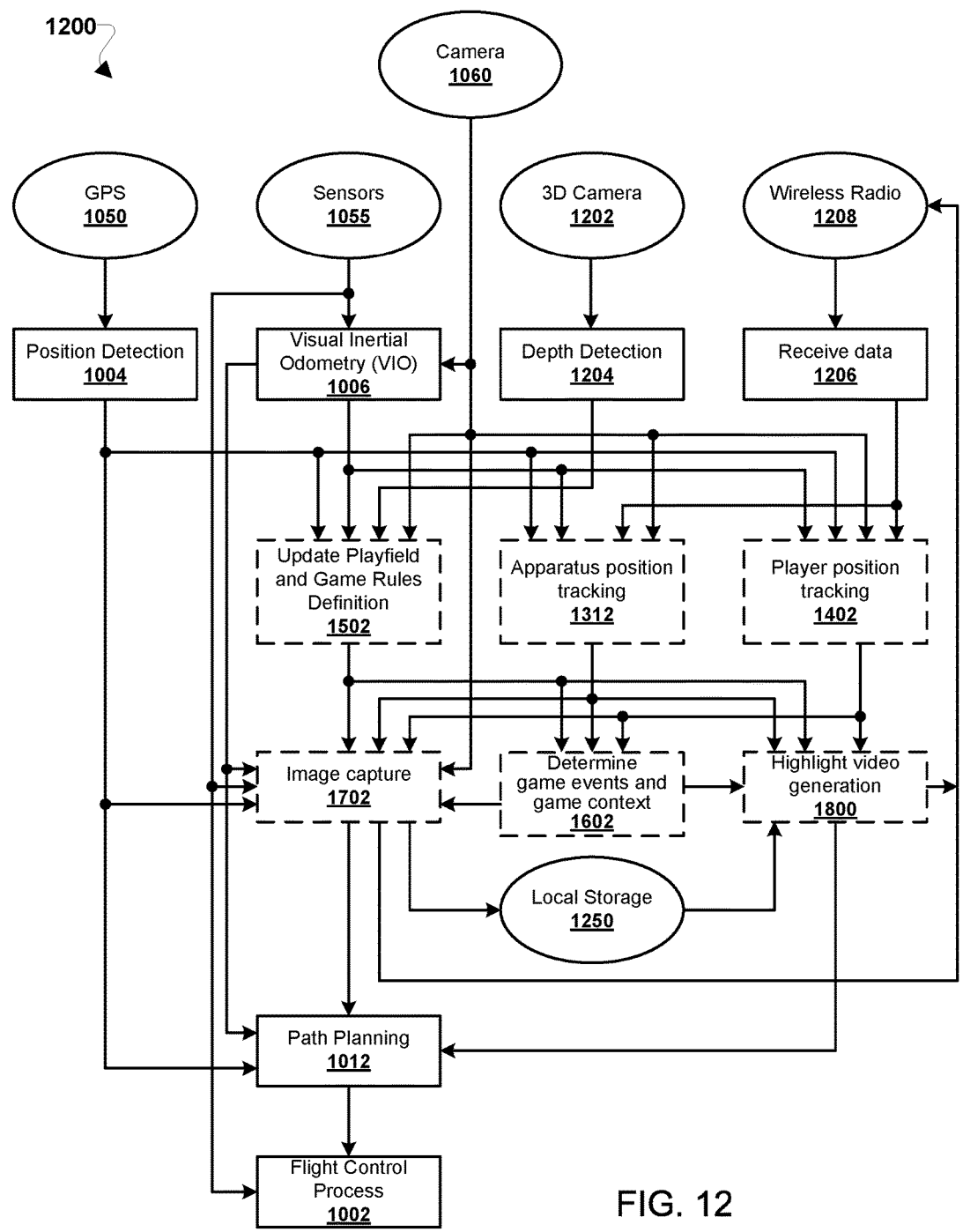
FIG. 12 is a data flow diagram illustrating data flows from data sources through processing stages and units for performing game operations of a UAV according to various embodiments.

FIG. 12 illustrates data flows from data sources through processing stages and units for implementing a method 1200 of performing game operations of a UAV (e.g., 102, 200, 650, 850 in FIGS. 1, 2, 6, and 8) according to various embodiments. With reference to FIGS. 1-12, the method 1200 may be implemented by a processor (e.g., the processor 220 and/or the like), which may control or execute the operations of one or more elements of the image capture location determination system 400. In some embodiments, the method 1200 includes one or more operations that may be performed as part of block 606 of the method 600.

The method 1200 may include a plurality processes for performing game operations of the UAV. In blocks 1004-1055, the processor may utilize components and may perform operations of like-numbered blocks of the method 1000.

If the UAV is equipped with a 3D camera (e.g. a stereo camera, structured light camera, or time of flight camera), a depth process 1204 may calculate calculates 3D depth or disparity data using information from the 3D camera.

A receive data process 1206 may receive data via a wireless radio 1208 from a game object or other sports equipment, from a player wearable device, or from one or more other UAVs.

Figure 13:
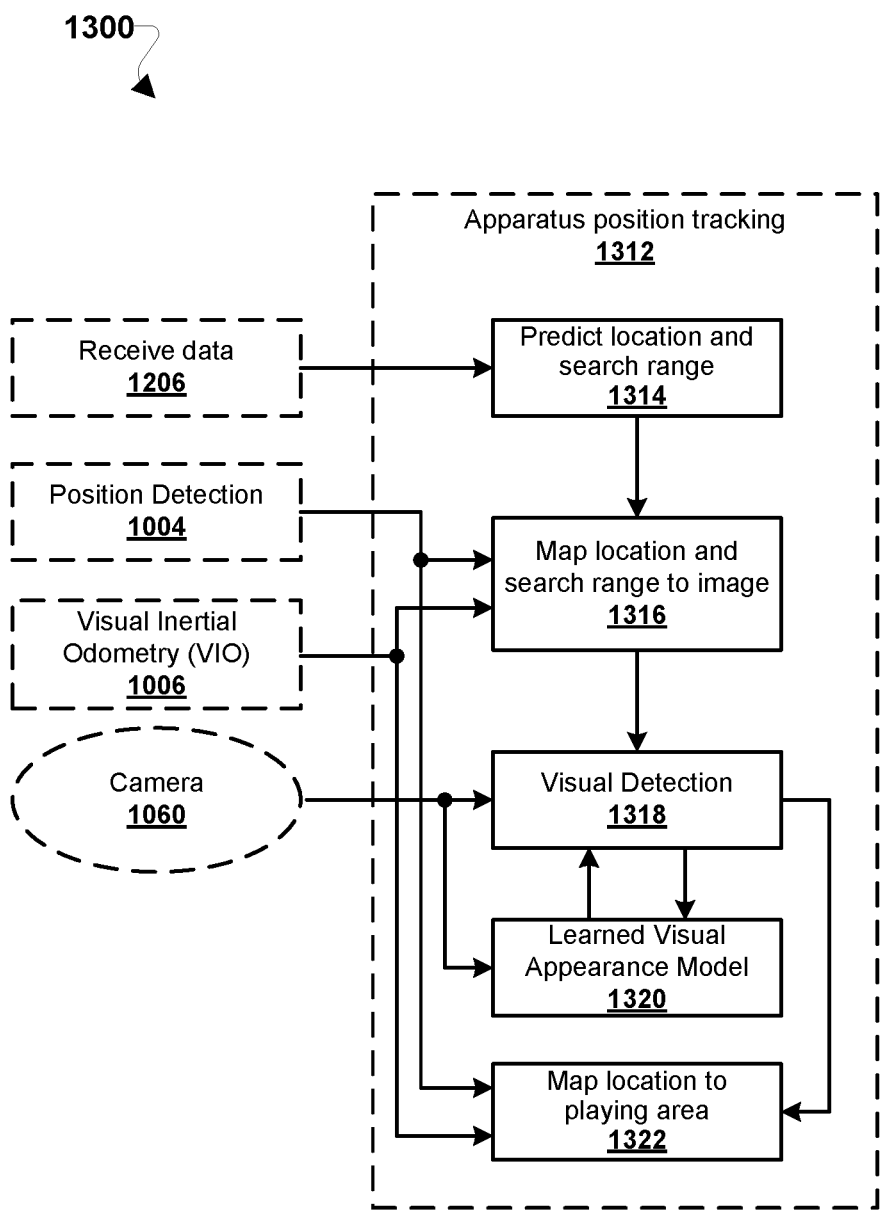
FIG. 13 is a data flow diagram illustrating data flows from data sources through processing stages and units for determining a position of game equipment by a UAV according to various embodiments.

FIG. 13 illustrates data flows from data sources through processing stages and units for implementing a method 1300 of determining a position of game equipment (e.g., a game object or other sports equipment) by a UAV (e.g., 102, 200, 650, 850 in FIGS. 1, 2, 6, and 8) according to various embodiments. With reference to FIGS. 1-13, the method 1300 may be implemented by a processor (e.g., the processor 220 and/or the like), which may control or execute the operations of one or more elements of the image capture location determination system 400. In some embodiments, the method 1300 includes one or more operations that may be performed as part of block 606 of the method 600.

In some embodiments, the receive data process 1206 may receive data from a game object, a player wearable device, and other sports apparatus (collectively referred to below as "sports apparatus" for conciseness). A position tracking process 1312 may compare the data received about positions of the game object, the player wearable device, and the other sports apparatus with the UAV's position in the definition of the playing area to determine a location of the sports apparatus relative to the UAV and/or to the playing area (e.g., the boundary and/or landmarks). The position tracking process 1312 may predict a location and/or a search range 1314 for the sports apparatus. The search range may include a limit on an area searched by the processor for players and sports apparatus. Multiple visually similar sports apparatuses (e.g., more than one ball) may be present within the camera image. For example, a second soccer ball that may have been used in practice and may be sitting outside of the play area's boundary. In some embodiments, the processor may impose a search range, such as within a play field boundary (e.g., the boundary 504, 522, 542, 544, and 562). The search range may also include a narrower search area, e.g., within a play area as further described below. The search range may enable a smaller image region to be processed by the visual detection processes, thereby reducing the calculations and central processing unit (CPU) load of the first mapping process 1316 and/or the visual detection process 1318.

A first mapping process 1316 may map the determined location(s) and search range to an image. In some embodiments, the first mapping process 1316 may use the predicted location and/or search range and information from the position detection process 1004 and the VIO process 1006 to map the determined location(s) and search range to the image. In some embodiments, the search range may include a bounding volume. In some embodiments, the first mapping process 1316 may use the search range to generate a probability map that may include probabilities of locations of the sports apparatus. In some embodiments, the first mapping process 1316 may use information from the camera 1060, which may include camera intrinsic and extrinsic parameters, such as lens distortion and camera alignment relative to the UAV.

In some embodiments, the UAV may not receive information (e.g., telemetry) from a game object, wearable device, or other sports apparatus, and may utilize a visual-inertial tracking process. In the visual-inertial tracking process, the processor may predict a location and search range of the sports apparatus using inertial data received from the sports apparatus. For example, inertial data from the sports apparatus may indicate that the sports apparatus may continue along a trajectory. In some embodiments, the first mapping process 1316 may execute an Extended Kalman Filter (EKF).

A visual detection process 1318 may detect a location of the sports apparatus within the search range based on, for example, a learned visual appearance model 1320 of the sports apparatus. In some embodiments, the visual detection process may execute one or more visual tracking algorithms and may aggregate the results thereof. In some embodiments, the visual tracking algorithms may include a Support Vector Machine (SVM) algorithm, a Lucas-Kanade (LK) algorithm, or another algorithm. The visual detection process 1318 may further weight any search results by the search range probability map.

In some embodiments, the processor may limit the visual detection process 1318 to the search range. For example, the sports apparatus may appear very small in the camera image, or may be moving quickly and may appear blurred in the camera image. The visual detection process 1318 may thus have low confidence in the position of the sports apparatus under those conditions. As another example, the search range may enable the visual detection process 1318 to track the in-game ball while ignoring the second ball outside of the search range.

In some embodiments, the processor may determine or adjust the search range along a determined trajectory of the sports apparatus to increase confidence in the detection of the sports apparatus. In some embodiments, the processor may determine or adjust the search range based on a change in the trajectory of the sports apparatus. For example, the sports apparatus inertial data, or a detected action, may indicate that the sports apparatus has changed trajectory (e.g., has been kicked, thrown, etc.). In such a case, there is greater uncertainty in the sports apparatus trajectory, and the processor may expand the search range. In some embodiments, the processor may adjust (e.g., increase or decrease) the search range by using information from the search range probability map. By adjusting the search range based on the sport apparatus's trajectory or change in trajectory, or by adjusting the search range using information from the search range probability map, the processor may increase the accuracy of the visual detection process 1318 while decreasing processing resources required to execute the process.

In some embodiments, the learned visual appearance model 1312 may generate and adapt a learned appearance model based on one or more changes in the appearance of the sports apparatus. In some embodiments, the learned visual appearance model 1312 may employ one or more visual learning algorithms, such as Support Vector Machine (SVM) and Normalized Cross Correlation (NCC).

A second mapping process 1322 may map the detected location of the sports apparatus within an image to a position relative to the UAV and/or to the boundary and/or landmarks of the playing area.

Figure 14:
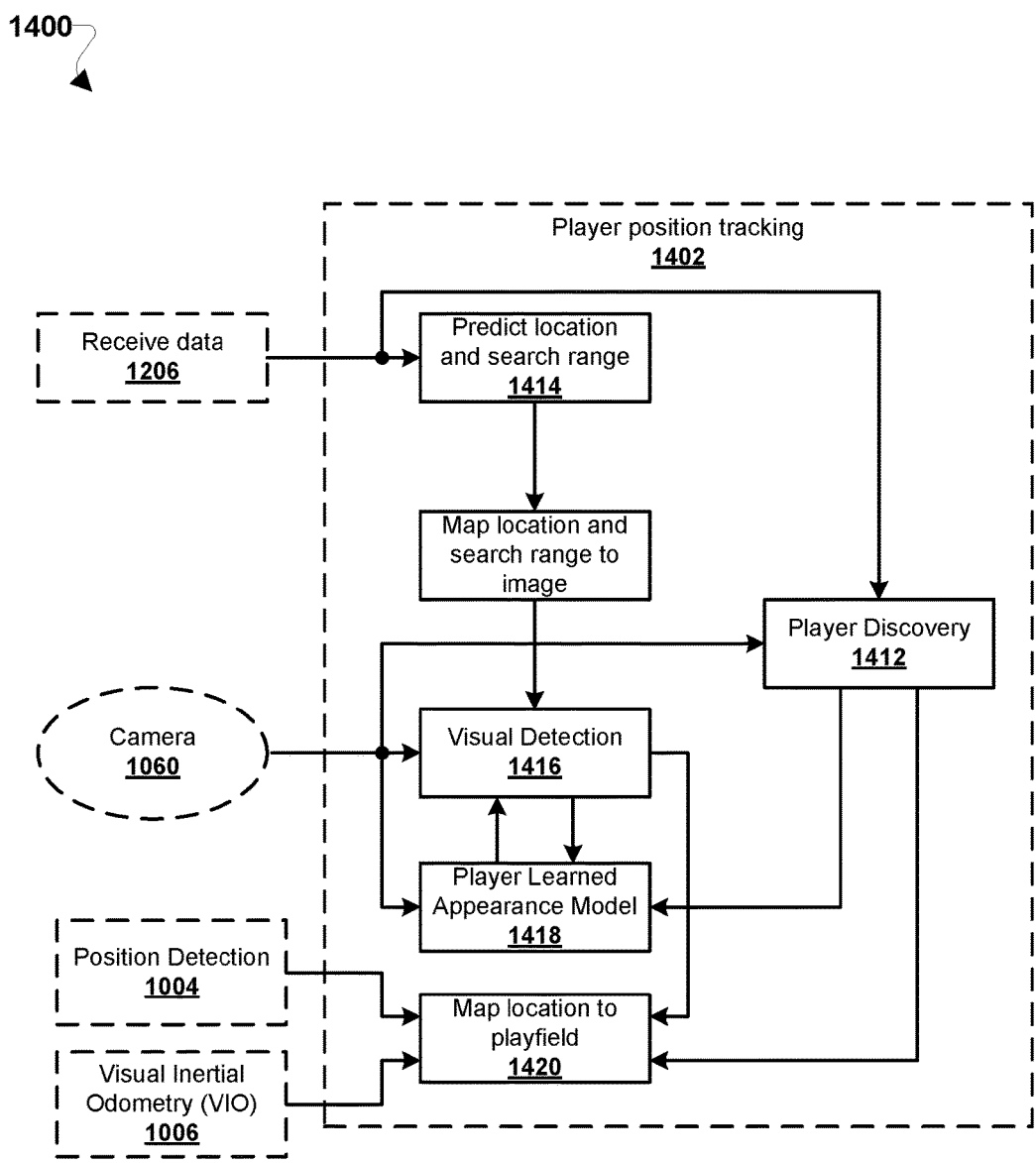
FIG. 14 is a data flow diagram illustrating data flows from data sources through processing stages and units for determining a position of game players by a UAV according to various embodiments.

FIG. 14 illustrates data flows from data sources through processing stages and units for implementing a method 1400 of determining a position of game players by a UAV (e.g., 102, 200, 650, 850 in FIGS. 1, 2, 6, and 8) according to various embodiments. With reference to FIGS. 1-14, the method 1400 may be implemented by a processor (e.g., the processor 220 and/or the like), which may control or execute the operations of one or more elements of the image capture location determination system 400. In some embodiments, the method 1400 includes one or more operations that may be performed as part of block 606 of the method 600.

A player position tracking process 1402 may receive player position information via the receive data process 1206 from, e.g., a wearable device of one or more players in the playing area. In some embodiments, each player may wear a wearable device that executes a position detection process. In some embodiments, each player may wear a wearable device that transmits information enabling the UAV to determine a location of each player wearable device. In some embodiments, the player position tracking process 1402 may compare a position of each wearable device, a position of the UAV, and a boundary and/or landmarks of the playing area to determine a location of each wearable device in the playing area.

In some embodiments in which one or more player wearable devices do not include a position detection process, the player position tracking process 1402 may use a visual-inertial tracking process. For example, a player discovery process 1412 may detect players that may be outside of or not previously detected by a camera of the UAV. The player discovery process 1412 may use a segmentation process to segment potential players, and a player classification process to classify a segment as a player. The prediction process 1414 may predict an image location and a search range of previously discovered players, and may aggregate a player's previous trajectory and optical flow vectors.

A visual detection process 1416 may receive information from the camera 1060 and may detect players located within a predicted image search range based on, for example, a player learned appearance model 1418. Visually detecting a player may include executing one or more visual tracking algorithms, and potentially aggregating the results of the one or more visual tracking algorithms. In some embodiments, a visual tracking algorithm may include a Support Vector Machine (SVM) algorithm, a Lucas-Kanade (LK) algorithm, or another algorithm. The visual detection process 1416 may further include weighting results by a search range probability map.

A mapping process 1420 may map discovered and/or detected player locations within an image to positions relative to the UAV and/or relative to the playing area (e.g., a boundary and/or landmarks), e.g., using information from the position detection process 1004 and the VIO process 1006.

Figure 15:
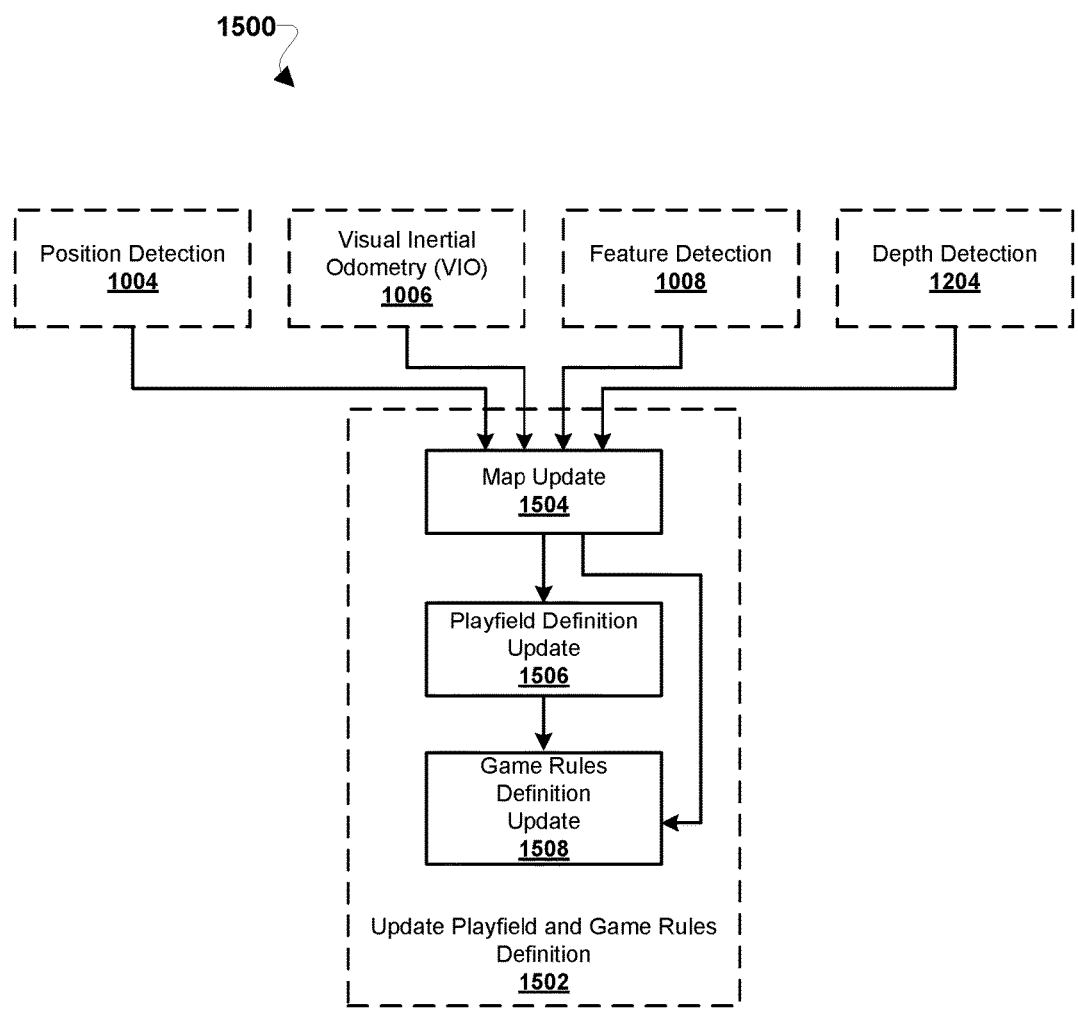
FIG. 15 is a process flow diagram illustrating a method of updating a definition of a playing area or game play rules by a UAV according to various embodiments.

FIG. 15 illustrates a method 1500 of determining updating a definition of a playing area and/or of game play rules by a UAV (e.g., 102, 200, 650, 850 in FIGS. 1, 2, 6, and 8) according to various embodiments. With reference to FIGS. 1-15, the method 1500 may be implemented by a processor (e.g., the processor 220 and/or the like), which may control or execute the operations of one or more elements of the image capture location determination system 400. In some embodiments, the method 1500 includes one or more operations that may be performed as part of block 606 of the method 600. In blocks 1004, 1006, 1008, and 1204, the processor may utilize components and perform operations of like numbered blocks of the methods 1000 and 1200.

A map update process 1504 may use information from one or more of the position detection process 1004, the VIO process 1006, the feature detection process 1008, and the depth detection process 1204. The map update process 1504 may update a projected position of one or more detected features of the playing area (e.g., a boundary, landmarks, a game object, players, etc.). The map update process 1504 may further determine whether a detected feature has moved in position, which may trigger one or more of a playfield definition update process 1506 and a game rules definition update process 11508.

The playfield definition update process 1506 may revise the definition of the playing area. For example, if the UAV determines that a pylon is moved (e.g., by a player), and the current definition of the playing area defines the pylon as a corner of the playing area, the playfield definition update process 1506 may update the definition of the playing area according to the newly detected location of the pylon.

The game rules definition update process 1508 may revise one or more game play rules based on one or more detected changes in the feature of the playing area. For example, during a survey process (e.g., block 604 of the method 600) the processor may have detected no landmarks associated with goals, and may therefore have generated game rules for casual play. Later during play, a player may add one or more landmarks (e.g., pylons) to the playing area, such as to mark goals. The playfield definition update process 1506 may recognize those new landmarks as demarking goals (for example, based on relative locations of and distances between the pylons). Further, in response to the definition update process 1506 recognizing the new landmarks as demarking goals, the games rule definition update process 1508 may add rules pertaining to scoring.

Figure 16:
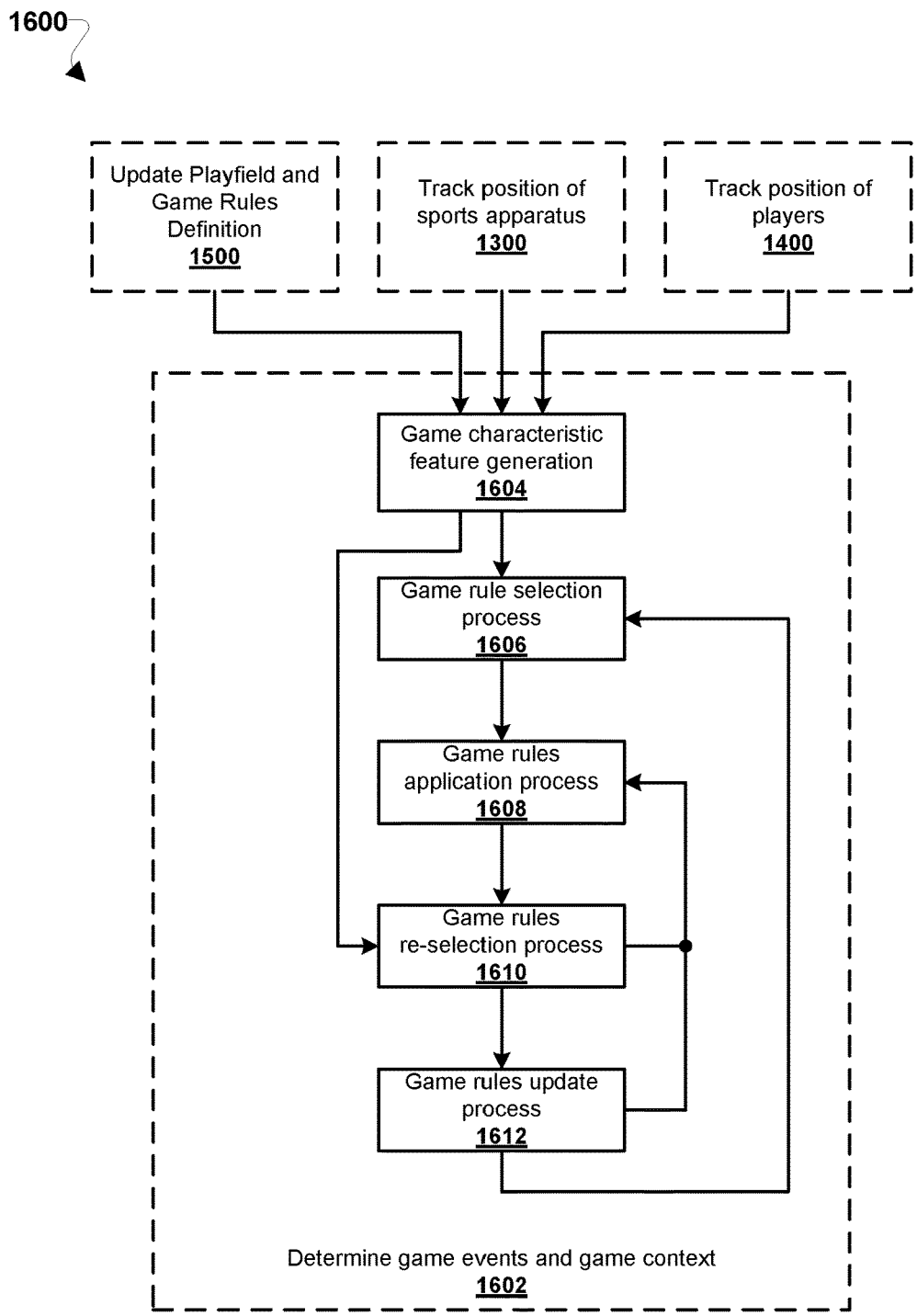
FIG. 16 is a process flow diagram illustrating a method of determining game events and the game context by a UAV according to various embodiments.

FIG. 16 illustrates data flows from data sources through processing stages and units for implementing a method 1600 of determining game events and a game context by a UAV (e.g., 102, 200, 650, 850 in FIGS. 1, 2, 6, and 8) according to various embodiments. With reference to FIGS. 1-16, the method 1600 may be implemented by a processor (e.g., the processor 220 and/or the like), which may control or execute the operations of one or more elements of the image capture location determination system 400. In some embodiments, the method 1600 includes one or more operations that may be performed as part of block 606 of the method 600.

A game events and game context determining process 1602 may use information generated by the methods 1300, 1400, and 1500, described above.

A game characteristic feature generation process 1604 may determine one or more game characteristics based on, e.g., the position action of a game object or other sports apparatus, the position and action of players, previous game state and events, and/or current game state and events. For example, upon detection of a kick action of a smart ball, game features may be generated including distance to goal, orientation of ball trajectory to goal, interception distance to each player, etc. examples of game features may include, for example, relative position of each player within a playfield definition, time remaining in a gameplay session, and other values that may include a time, a count, a distance, an orientation of sports apparatus and/or players, etc. Various game characteristics may have a Boolean, scalar, or vector value.

The game rules selection process 1606 may determine whether a rule applies to current game context and/or event. The game rule selection process 1606 may select a most probable rule of a set of game rules, and/or multiple alternative game rules of a super-set of game rules, the alternative game rules having lessor probability or belonging the set super-set of game rules but possibly not the set of game rules. In some embodiments, the game rules selection process 1604 may use a classification algorithm. For example, a classification algorithm may include a Regression Classification algorithm (e.g. Linear Regression or Logistic Regression) whereby each game characteristic feature forms an explanatory variable. As another example, a classification algorithm may include a Random Forest. As another example, a classification algorithm may include be a Neural Network whereby each game characteristic feature forms an input variable. A classification algorithm may be trained based on examples (synthesized, or sampled data) using a super-set of potential game rules.

A game rules application process 1608 may apply a game rule to a game context and/or game event. The game rules application process 1608 may maintain a set of game states for a set of selected and/or alternative game rules. A game state may include, for example, ball-in-play, side of possession, penalty kick, score, etc. A game state may also include identification of players, for example, player with position, defending player, goaltender, potential receivers, etc. A game event may include, for example, a score, foul, etc. Game states and game events may include a timestamp or time range, and a list of prior and current game states and game events may be maintained.

A game rules re-selection process 1610 may retroactively apply an alternative game rule. For example, the game rules re-selection process 1610 may compare game characteristic features to expected game characteristic features for each of a set of game states. If the game characteristic features corresponds closer to the expected game characteristic features of an alternative game state, the corresponding alternative game rule and alternative game state may be promoted to the selected game rule and game state, and the originally selected game rule and originally selected game state may be demoted to an alternative game rule and alternative game state (or, alternatively, simply discarded). Thus, if the actions of the players correspond better an alternative game rule or state, the game rules reselection process 1608 may select the alternative game rule and state.

A game rules update process 1612 may remove, generate, or edit game play rules. For example, the game rules update process 1612 may remove from the set of game play rules certain game play rules that are associated with game states that are demoted (or discarded) by the game rule re-selection process. For example, if players elect or decide to not follow offside rules, the UAV may receive an appropriate input, e.g., via controller, and the game rules update process 1612 may remove an offside game rule from the applicable set of game play rules. As another example, the game rules update process 1612 may promote into the applicable set of game play rules certain rules that are associated with game states that the game rule re-selection process 1610 promotes. For example, in an American football game, if players are observed to stop when in close proximity to an opposing player, game rules update process 1612 may update the applicable game play rules to reflect touch football rules (rather than tackle football rules). In some embodiments, the game rules update process 1612 may include a learning algorithm to generate new rules based on observed characteristic features. Any game rule updates, including generated new rules, may be saved to local storage for inclusion into the set of game rules of future games.

Figure 17:
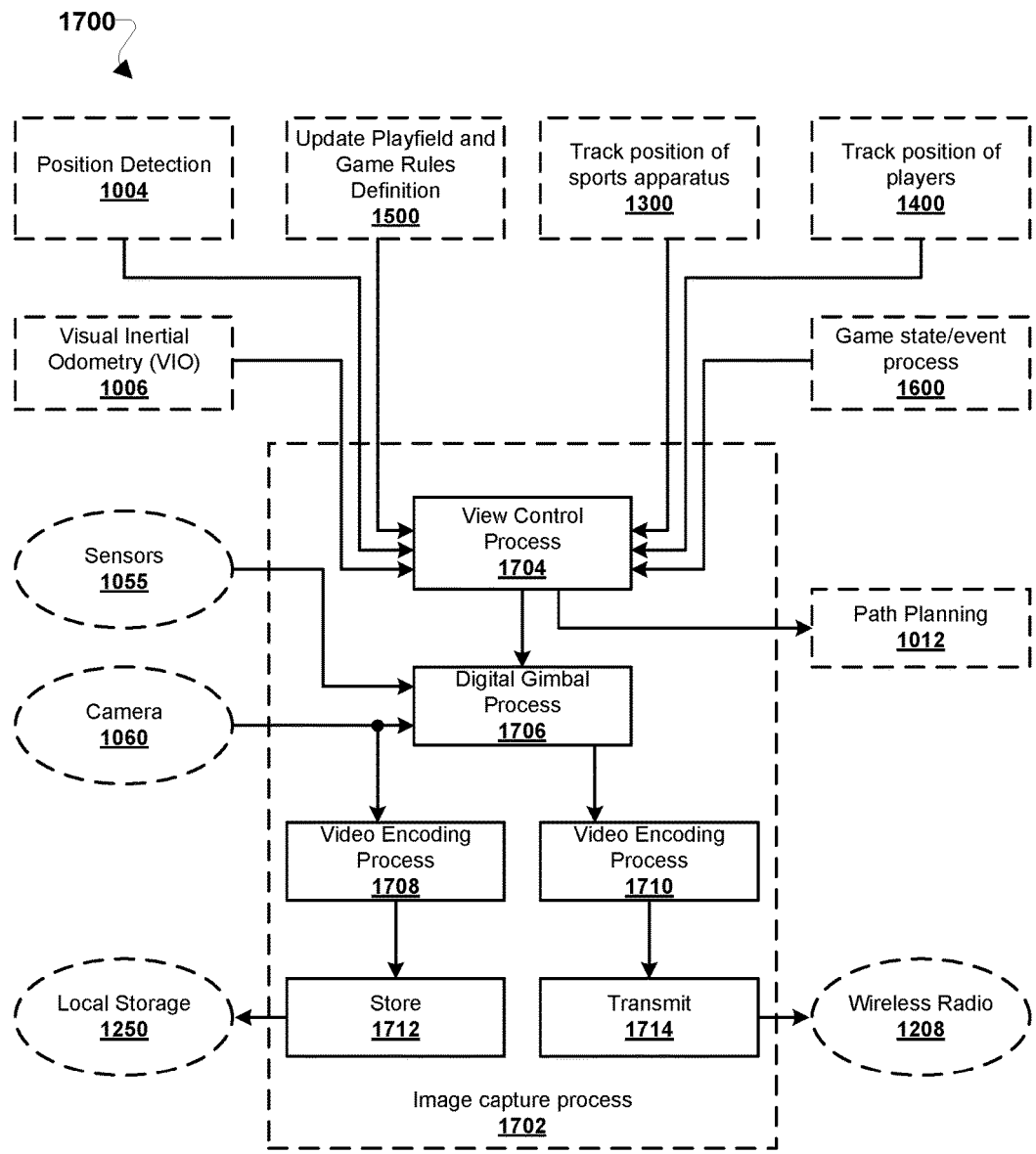
FIG. 17 is a process flow diagram illustrating a method of an image capture process by a UAV according to various embodiments.

FIG. 17 illustrates data flows from data sources through processing stages and units for implementing a method 1700 of an image capture process by a UAV (e.g., 102, 200, 650, 850 in FIGS. 1, 2, 6, and 8) according to various embodiments. With reference to FIGS. 1-17, the method 1700 may be implemented by a processor (e.g., the processor 220 and/or the like), which may control or execute the operations of one or more elements of the image capture location determination system 400. In some embodiments, the method 1700 includes one or more operations that may be performed as part of block 606 of the method 600.

An image capture process 1702 may use information generated by the position detection process 1004, the VIO process 1006, and the methods 1300, 1400, 1500, and 1600, described above.

A view control process 1704 may control a camera and/or UAV position based on one or more of a game context, a game event, a position and/or action of a game object or other sports apparatus, a position and/or action of game players, a playing area definition, and one or more game play rules. In some embodiments, the view control process 1704 may generate a first field of view and a second field of view, in which the second field of view is contained within the first field of view. In some embodiments, the first field of view may be associated with the range of a mechanical camera gimbal or a field of view of a fisheye lens utilized by a digital gimbal system. In some embodiments, the second field of view may be based on one or more of a pan, a tilt, and/or a zoom position (that may be real or synthesized) within the first field of view. For example, the second field of view may include a position of a smart ball or other sports apparatus the second field of view may also include game information such as an identity of a player in possession of the smart ball or other sports apparatus. In some embodiments, the first field of view may include potential receiving players as identified in a game context, a position of the goal is defined in a playing area definition, or other similar game information. The view control process 1704 may be dependent on a game context or game of that. For example, during an outbound game event or a dead ball game event, the first field of view may include a central position of the playing area in which game play is predicted to resume, and the second field of view may include a close-up view of a player, such as a player throwing in the ball (i.e., returning the ball to an in-play state).

A digital gimbal process 1706 may process an image captured by the camera 1060, and may use information from the sensors 1055 to process the captured image. Such image processing may include cropping, digital image stabilization, electronic image stabilization, rolling shutter correction, fisheye lens distortion, and the like, as described above with reference to the image capture and processing system 300. In some embodiments, the digital gimbal process 1706 may process a camera image of the first field of view to generate the second field of view, which may include a synthesized camera image.

In some embodiments, the digital gimbal process 1706 may process a camera image of the first field of view to define and generate a synthesized camera image for the second field of view. In some embodiments, the definition of the second field of view may find a processing of the camera image of the first field of view to include cropping, digital image stabilization, electronic image stabilization, rolling shutter correction, fisheye lens distortion, etc. In some embodiments, the image content of the first field of view required to generate the second field of view may not include a rectangular portion of the camera image suitable for encoding. In such embodiments, the digital gimbal process 1706 may define a third field of view that may include such image content as may be necessary to generate the second field of view that may be expanded, scaled, rotated, and/or warped to form a rectangular portion of the camera image. In some embodiments, the definition may be encoded in a video encoding process 1710 for transmission in a transmission process 1714, as further described below. The transmitted definition may enable a receiving device to display the received encoded video based on the definition, for example, to apply cropping, digital image stabilization, electronic image stabilization, rolling shutter correction, fisheye lens distortion, etc. to a received image.

A video encoding process 1708 may include a first video stream of the first field of view and may include a second video stream of the second field of view. In some embodiments, each of the first and second video streams may include a different video resolution and a different bit rate. For example, the video encoding process 1708 may encode the first video stream at a high resolution bit rate that may be suitable for writing to the local storage 1250 (e.g., an SD card) in a storage process 1712. As another example, the video encoding process 1708 may encode the second video stream at a lower or reduced resolution and or bit rate that may be suitable for transmission over a communications network. In some embodiments, the video encoding process 1708 may dynamically select a resolution and or bit rate for the second video stream based upon, for example, a signal strength and/or bandwidth of a wireless communication link.

In some embodiments that may use a mechanical gimbal, the camera image of the second field of view may be processed to generate a synthesized camera image of the second field of view. The synthesized camera image may include cropping, digital image stabilization, electronic image stabilization, rolling shutter correction, fisheye lens distortion, etc.

Figure 18:
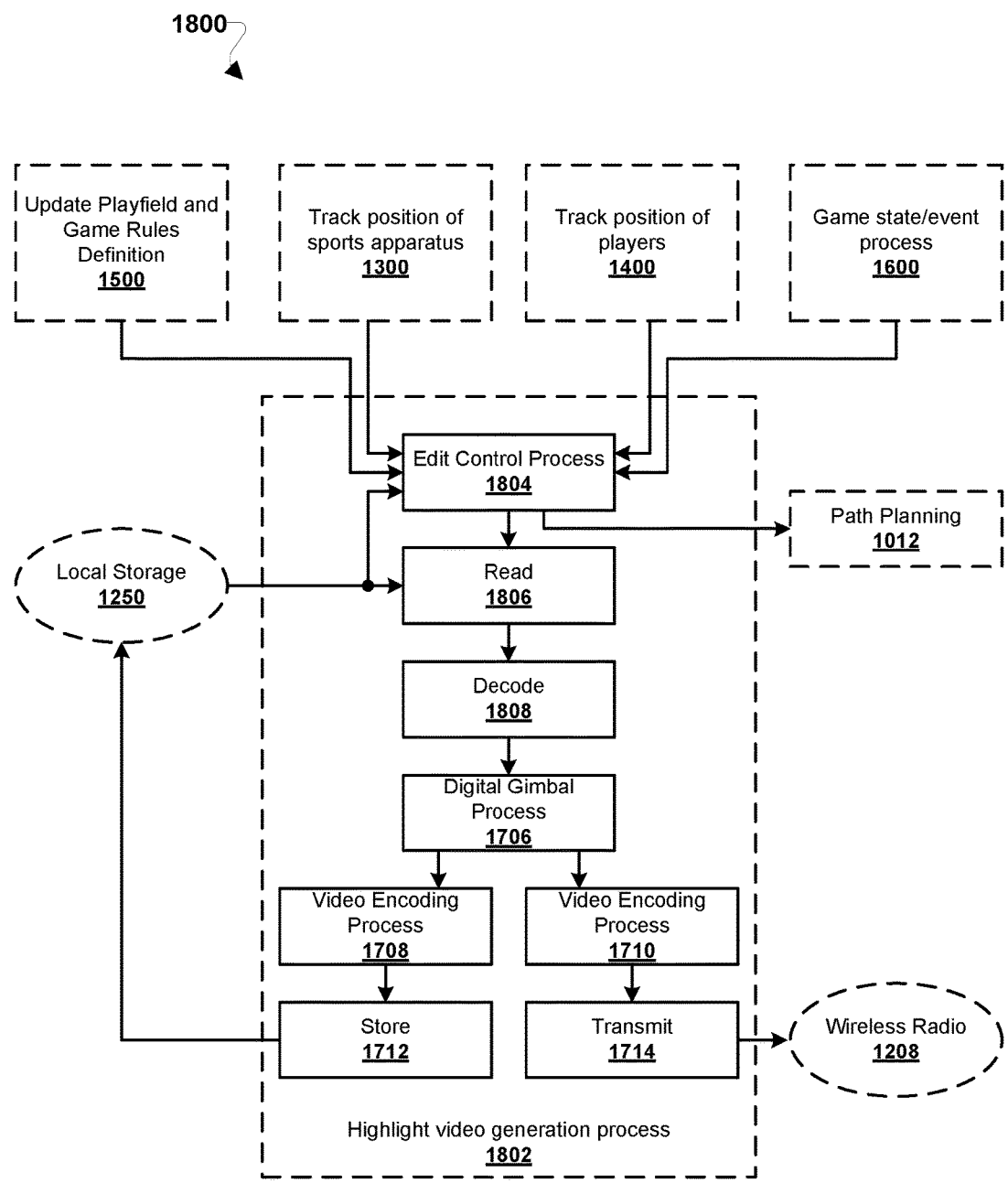
FIG. 18 is a process flow diagram illustrating a method of a highlight video generation process by a UAV according to various embodiments.

FIG. 18 illustrates data flows from data sources through processing stages and units for implementing a method 1800 of a highlight video generation process by a UAV (e.g., 102, 200, 650, 850 in FIGS. 1, 2, 6, and 8) according to various embodiments. With reference to FIGS. 1-18, the method 1800 may be implemented by a processor (e.g., the processor 220 and/or the like), which may control or execute the operations of one or more elements of the image capture location determination system 400. In some embodiments, the method 1800 includes one or more operations that may be performed as part of block 606 of the method 600.

A highlight video generation process 1802 may use information generated by the methods 1300, 1400, 1500, and 1600, described above.

The highlight video generation process 1802 may recompose video that is previously encoded to the local storage 1250. The highlight video generation process 1802 may be triggered by a game context change or game event. For example, the highlight video generation process 1802 may be triggered by an occurrence of a goal or save event, and out of bounds or dead ball state, or another game event.

An edit control process 1804 may provide information to control the digital gimbal process 1706 based on one or more of, a game context, a game event, a position and/or action of a game object or other sports apparatus, a position and/or action of a player, a playing area definition, and one or more game play rules. The edit control process 1802 may identify a time range associated with a triggering game event or context change. The edit control process 1804 may generate a fourth field of view, which may be within a previously encoded first field of view within the time range. For example, during a goal or save game event, the edit control process 1804 may define a time range to include one or more game events that preceded the goal or save, such as a preceding pass and kick of the ball and/or players involved in the preceding game events. In some embodiments, the edit control process 1804 may notify the path planning process 1012 that a flight path need not be linked to or tied to image capture (e.g., videography) during a duration of the highlight video.

A read process 1806 may read a previously encoded video stream from the local storage 1250.

A decode process 1808 may decode the previously encoded video stream from the local storage.

The digital gimbal process 1706 may process the decoded video stream to generate the fourth field of view (e.g., a synthesized camera image) from the decoded video stream. The digital gimbal process 1706 may further process the fourth field of view to include corrections including cropping, digital and/or electronic image stabilization, rolling shutter correction, fisheye lens distortion correction, etc.

The video encoding process 1708 may encode a third video stream, and the video encoding process 1710 may encode a fourth video stream. The third and fourth video streams may both include the fourth field of view, and each of the third and fourth video streams may be of a different resolution and or bit rate. For example, the video encoding process 1708 may encode the third video stream at high resolution and bit rate suitable for writing to the local storage 1250 via the store process 1712, and the video encoding process 1710 may encode the fourth video stream at a lower resolution and/or bit rate suitable for transmission to take medications network over a wireless communication link (e.g., via the transmit process 1714 using the wireless radio 1208).

In various embodiments, the image capture process 1700 and or the highlight video generation process 1800 may provide information to the path planning process 1012. For example, during the transmission of the highlight video, the path planning process 1012 may calculate a flight path to land the UAV to conserve energy or recharge, or fly to a ready position. As another example, the image capture process 1700 may direct the path planner to fly alongside players as the players advance towards a goal. Following a goal event, the highlight process 1800 may be triggered, providing time for the path planning process 1012 to return the UAV to a center area of the playing area.

Various embodiments enable the processor of the UAV to improve the capture of images of a game by the UAV. Various embodiments also improve the efficiency of image capture of the game by the UAV. Various embodiments further improve the accuracy of game image capture by applying game play rules of the game being recorded, determining locations of a game object, players, a boundary, and landmarks, and calculating a position from which to capture an image of the game by a camera of the UAV.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600, 700, and 900-1800 may be substituted for or combined with one or more operations of the methods 600, 700, and 900-1800, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then,"

"next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of capturing images of a game by an unmanned autonomous vehicle (UAV), comprising:
   surveying, by a processor of the UAV, a playing area of the game;
   determining, by a processor of the UAV, game play rules of the game based on the survey of the playing area of the game;
   determining, by the processor, a location of a game object;
   calculating, by the processor, a position from which to capture an image of the game based on the determined game play rules and the location of the game object; and
   capturing an image of the game from the calculated position.

2. The method of claim 1, wherein determining the game play rules comprises:
   obtaining the game play rules from a memory coupled to the processor of the UAV.

3. The method of claim 1, wherein determining the game play rules comprises:
   identifying, by the processor, a landmark of the playing area; and
   determining, by the processor, the game play rules based on the identified landmark of the playing area.

4. The method of claim 1, wherein determining the location of the game object comprises:
   receiving telemetry from the game object; and
   determining the location of the game object based on the received telemetry.

5. The method of claim 1, wherein calculating the position from which to capture the image of the game based on the determined game play rules and the location of the game object comprises:
   predicting, by the processor, a game action based on the game play rules and the determined location of the game object; and
   calculating, by the processor, the position based on the predicted game action.

6. The method of claim 1, wherein calculating the position from which to capture the image of the game based on the determined game play rules and the location of the game object comprises:
   characterizing, by the processor, a game context based on the determined game play rules and the location of the game object; and
   calculating, by the processor, the position based on the characterized game context.

7. The method of claim 6, further comprising:
   determining, by the processor, whether the game context has changed; and calculating, by the processor, another position from which to capture a second image of the game based on the determined game play rules and the changed game context.

8. The method of claim 1, wherein capturing the image of the game from the calculated position comprises:
moving the UAV to the calculated position.

9. The method of claim 1, wherein capturing the image of the game from the calculated position comprises:
selecting, by the processor, a second UAV proximate to the calculated position; and
capturing the image of the game from the calculated position by the second UAV.

10. An unmanned autonomous vehicle (UAV), comprising:
an image sensor; and
a processor coupled to the image sensor and configured with processor-executable instructions to:
survey a playing area of a game;
determine game play rules of the game based on the survey of the playing area of the game;
determine a location of a game object;
calculate a position from which to capture an image of the game based on the determined game play rules and the location of the game object; and
capture an image of the game from the calculated position.

11. The UAV of claim 10, wherein the processor is further configured with processor-executable instructions to:
obtain the game play rules from a memory coupled to the processor of the UAV.

12. The UAV of claim 10, wherein the processor is further configured with processor-executable instructions to:
identify a landmark of the playing area; and
determine the game play rules based on the identified landmark of the playing area.

13. The UAV of claim 10, wherein the processor is further configured with processor-executable instructions to:
receive telemetry from the game object; and
determine the location of the game object based on the received telemetry.

14. The UAV of claim 10, wherein the processor is further configured with processor-executable instructions to:
predict a game action based on the game play rules and the determined location of the game object; and
calculate the position from which to capture the image of the game based on the predicted game action.

15. The UAV of claim 10, wherein the processor is further configured with processor-executable instructions to:
characterize a game context based on the determined game play rules and the location of the game object; and
calculate the position from which to capture the image of the based on the characterized game context.

16. The UAV of claim 15, wherein the processor is further configured with processor-executable instructions to:
determine whether the game context has changed; and
calculate another position from which to capture a second image of the game based on the determined game play rules and the changed game context.

17. The UAV of claim 10, wherein the processor is further configured with processor-executable instructions to:
move the UAV to the calculated position.

18. The UAV of claim 10, wherein the processor is further configured with processor-executable instructions to:
select a second UAV proximate to the calculated position; and capture the image of the game from the calculated position by the second UAV.

19. An unmanned autonomous vehicle (UAV), comprising:
means for surveying a playing area of a game;
means for determining game play rules of the game based on the survey of the playing area of the game;
means for determining a location of a game object;
means for calculating a position from which to capture an image of the game based on the determined game play rules and the location of the game object; and
means for capturing an image of the game from the calculated position.

20. A non-transitory processor-readable medium having stored thereon processor-executable instructions configured to cause a processor of an unmanned autonomous vehicle (UAV) to perform operations comprising:
surveying a playing area of a game;
determining game play rules of the game based on the survey of the playing area of the game;
determining a location of a game object;
calculating a position from which to capture an image of the game based on the determined game play rules and the location of the game object; and
capturing an image of the game from the calculated position.

21. The non-transitory processor-readable medium of claim 20, wherein the stored processor-executable instructions are further configured to cause the processor of the UAV to perform operations such that determining the game play rules comprises:
obtaining the game play rules from a memory coupled to the processor of the UAV.

22. The non-transitory processor-readable medium of claim 20, wherein the stored processor-executable instructions are further configured to cause the processor of the UAV to perform operations such that determining the game play rules comprises:
identifying a landmark of the playing area; and
determining the game play rules based on the identified landmark of the playing area.

23. The non-transitory processor-readable medium of claim 20, wherein the stored processor-executable instructions are further configured to cause the processor of the UAV to perform operations such that determining the location of the game object comprises:
receiving telemetry from the game object; and
determining the location of the game object based on the received telemetry.

24. The non-transitory processor-readable medium of claim 20, wherein the stored processor-executable instructions are further configured to cause the processor of the UAV to perform operations such that calculating the position from which to capture the image of the game based on the determined game play rules and the location of the game object comprises:
predicting a game action based on the game play rules and the determined location of the game object; and
calculating the position based on the predicted game action.

25. The non-transitory processor-readable medium of claim 20, wherein the stored processor-executable instructions are further configured to cause the processor of the UAV to perform operations such that calculating the position from which to capture the image of the game based on the determined game play rules and the location of the game object comprises:

characterizing a game context based on the determined game play rules and the location of the game object; and calculating the position based on the characterized game context.

26. The non-transitory processor-readable medium of claim 25, wherein the stored processor-executable instructions are configured to cause the processor of the UAV to perform operations further comprising:

determining whether the game context has changed; and calculating another position from which to capture a second image of the game based on the determined game play rules and the changed game context.

27. The non-transitory processor-readable medium of claim 20, wherein the stored processor-executable instructions are further configured to cause the processor of the UAV to perform operations such that capturing the image of the game from the calculated position comprises:

moving the UAV to the calculated position.

28. The non-transitory processor-readable medium of claim 20, wherein the stored processor-executable instructions are further configured to cause the processor of the UAV to perform operations such that capturing the image of the game from the calculated position comprises:

selecting a second UAV proximate to the calculated position; and capturing the image of the game from the calculated position by the second UAV.

* * * * *